US012770078B2

(12) United States Patent
Shinde

(10) Patent No.: US 12,770,078 B2
(45) Date of Patent: Oct. 20, 2026

(54) SYSTEMS AND METHODS FOR EFFICIENTLY UPDATING SOLUTIONS TO MULTI-OBJECTIVE HIERARCHICAL LINEAR PROGRAMMING PROBLEMS

(71) Applicant: Blue Yonder Group, Inc., Scottsdale, AZ (US)

(72) Inventor: Vishal Shinde, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 18/526,740

(22) Filed: Dec. 1, 2023

(65) Prior Publication Data

US 2024/0112111 A1 Apr. 4, 2024

Related U.S. Application Data

(63) Continuation of application No. 16/700,390, filed on Dec. 2, 2019, now Pat. No. 11,875,289.

(Continued)

(51) Int. Cl.
*G06Q 10/0631* (2023.01)
*G06K 7/10* (2006.01)

(Continued)

(52) U.S. Cl.
CPC ... *G06Q 10/06315* (2013.01); *G06K 7/10722* (2013.01); *G06K 7/1413* (2013.01);

(Continued)

(58) Field of Classification Search
CPC ...... G06Q 10/04; G06Q 10/087; G06Q 10/08; G06Q 10/06313; G06Q 10/067; G06Q 10/063
See application file for complete search history.

(56) References Cited

U.S. PATENT DOCUMENTS 1,150,121 A 8/1915 Jaquith
5,715,165 A 2/1998 Luh et al.

(Continued)

OTHER PUBLICATIONS

Stadtler, Hartmut et al., Supply Chain Management and Advanced Planning Springer, Fifth Edition, 2015 (Year: 2015).*

(Continued)

*Primary Examiner* — Scott L Jarrett
(74) *Attorney, Agent, or Firm* — Spencer Fane LLP; Steven J. Laureanti

(57) ABSTRACT

A system and method are disclosed for solving subsequent runs of a supply chain planning problem modeled as a multi-objective hierarchical linear programming problem. Embodiments further include receiving supply chain input data for a supply chain planning problem, modeling the supply chain planning problem as a multi-objective hierarchal linear programming problem having a first objective and at least one additional objective, solving a base run of the multi-objective hierarchical linear programming problem for the first objective and the at least one additional objective, generating a base plan by converting a solution of the base run of the multi-objective hierarchical linear programming problem, receiving one or more changes to the supply chain input data, identifying primal feasibility change of the one or more changes that affect only primal feasibility, and identifying dual feasibility changes of the one or more changes that affect only dual feasibility.

20 Claims, 14 Drawing Sheets

Related U.S. Application Data

(60) Provisional application No. 62/839,311, filed on Apr. 26, 2019, provisional application No. 62/802,794, filed on Feb. 8, 2019.

(51) Int. Cl.

| | |
|---|---|
| ***G06K 7/14*** | (2006.01) |
| ***G06Q 10/083*** | (2024.01) |
| ***G06Q 10/087*** | (2023.01) |
| ***G06Q 50/04*** | (2012.01) |

(52) U.S. Cl.

CPC ......... *G06Q 10/083* (2013.01); *G06Q 10/087* (2013.01); *G06Q 50/04* (2013.01)

(56) References Cited

U.S. PATENT DOCUMENTS

| | | | | |
|---|---|---|---|---|
| 6,735,596 | B2 | 5/2004 | Corynen | |
| 7,552,067 | B2 | 6/2009 | Nephew et al. | |
| 7,672,862 | B1 * | 3/2010 | Venkatasubramanyan .................. | G06Q 10/08 705/7.22 |
| 7,689,592 | B2 | 3/2010 | Denton et al. | |
| 7,801,754 | B2 | 9/2010 | Kasper et al. | |
| 8,359,286 | B1 | 1/2013 | Nering et al. | |
| 8,429,035 | B1 | 4/2013 | Kamath et al. | |
| 8,620,729 | B2 | 12/2013 | Srinivasa et al. | |
| 9,224,110 | B2 | 12/2015 | Moorkanat et al. | |
| 11,875,289 | B1 * | 1/2024 | Shinde ............. | G06Q 10/06315 |
| 2003/0167265 | A1 * | 9/2003 | Corynen ................ | G06Q 10/04 |
| 2006/0155593 | A1 * | 7/2006 | Kasper ................... | G06Q 10/04 705/7.29 |
| 2007/0038657 | A1 * | 2/2007 | Denton .................. | G06Q 10/04 |
| 2007/0192160 | A1 * | 8/2007 | Nephew ........... | G06Q 10/06315 705/7.25 |
| 2008/0221960 | A1 * | 9/2008 | Moorkanat ............ | G06Q 10/04 705/7.25 |
| 2012/0035984 | A1 * | 2/2012 | Gorur Narayana Srinivasa .......... | G06Q 10/06375 705/7.35 |
| 2013/0238385 | A1 * | 9/2013 | Kamath ............. | G06Q 10/0633 705/7.27 |
| 2015/0112750 | A1 * | 4/2015 | Grichnik .......... | G06Q 10/06313 705/7.23 |
| 2015/0331833 | A1 * | 11/2015 | Lustig ..................... | G06F 17/11 708/274 |
| 2017/0024357 | A1 | 1/2017 | Peterson | |
| 2019/0311309 | A1 * | 10/2019 | Kamath ................. | G06Q 10/06 |

OTHER PUBLICATIONS

Aslam et al., "Multi-Objective Optimization for Supply Chain Management: A Literature Review and New Development", IEEE 8th International Conference on Supply Chain Management and Information Systems, 2010 (Year: 2010).

Vats et al., "A review of multi-objective inventory control problem", International Journal of Intelligent Enterprise, vol. 5, No., 3, Jan. 2018 (Year: 2018).

Oracle Strategic Network Optimization Implementation Guide, Release 12.1, Oracle, Apr. 2011 (Year: 2011).

Multi-objective optimization, definition Wikipedia.org, Retrieved May 11, 2021 (Year: 2021).

Linear programming, definition Wikipedia.org, Retrieved May 11, 2021 (Year: 2021).

Gaur et al., "Multi-level Multi-objective Integer Linear Programming Problem", AMO, Advanced Modeling and Optimization, vol. 10, No. 2, (Year: 2008).

Maravelias, Christos T., "Mixed-integer programming models for supply chain optimization" Process Modeling and Optimization for Energy and Sustainability, PASI 2011, Jul. 2011 (Year 2011).

Shao et al., Primal and dual multi-objective linear programming algorithms for linear multiplicative programmes Optimization, Mar. 18, 2015 (Year: 2015).

* cited by examiner

600

| SR. NO. (602) | FUNCTIONAL CHANGE (604) | CORRESPONDING CHANGE IN LPP (606) | RETAINS PRIMAL FEASIBILITY (608) | RETAINS DUAL FEASIBILITY (610) |
|---|---|---|---|---|
| 1 | ADDING NEW DEMAND (NON-LATEABLE) | ADD NEW VARIABLE | YES | NO |
| 2 | CHANGE DEMAND PRIORITY | CHANGE OBJECTIVE COEFFICIENT | YES | NO |
| 3 | CHANGE DEMAND NeedQty | CHANGE UPPER BOUND | NO | YES |
| 4 | CHANGE DEMAND NeedDate | ADD NEW VARIABLE, CHANGE OBJECTIVE COEFFICIENT AND CHANGE UPPER BOUND | NO | NO |
| 5 | ADDING NEW DEMAND (LATEABLE) | ADD NEW VARIABLE AND ADD NEW CONSTRAINT CONSISTING OF ONLY NEW VARIABLES | YES | NO |
| 6 | ADDING WORK-IN-PROGRESS (WIP) | CHANGE RIGHT HAND SIDE VALUE | NO | YES |
| 7 | CHANGE WIP QTY | CHANGE RIGHT HAND SIDE VALUE | NO | YES |
| 8 | CHANGE WIP DATE | CHANGE RIGHT HAND SIDE VALUE | NO | YES |
| 9 | CHANGE RESOURCE CAPACITY | CHANGE UPPER BOUND | NO | YES |
| 10 | FIX OPERATION PLAN QTY | CHANGE UPPER AND LOWER BOUND | NO | YES |

FIG. 6

| EXP. NO. (1202) | DATASET (1204) | METHOD 400 RunTime (IN SECS) (1206) | METHOD 900 RunTime (IN SECS) (1208) | METHOD 900 X TIMES IMPROV (1210) | METHOD 900 % TIME REQUIRED (1212) | METHOD 1100 RunTime (IN SECS) (1214) | METHOD 1100 X TIMES IMPROV (1216) |
|---|---|---|---|---|---|---|---|
| 1 | DATASET 1 | 3823 | 2336 | 1.64 | 61.10 | 504 | 7.59 |
| 2 | | 3715 | 555 | 6.69 | 14.94 | 243 | 15.29 |
| 3 | | 3595 | 9 | 399.44 | 0.25 | 245 | 14.67 |
| 4 | | 5045 | 5387 | **0.94** | **106.78** | 7180 | **0.70** |
| 5 | | 3609 | 1616 | 2.23 | 44.78 | 238 | 15.16 |
| 6 | | 3320 | 10 | 332.00 | 0.30 | 245 | 13.55 |
| 7 | DATASET 2 | 1544 | 55 | 28.07 | 3.56 | 174 | 8.87 |
| 8 | | 1496 | 47 | 31.83 | 3.14 | 172 | 8.70 |
| 9 | | 1347 | 45 | 29.93 | 3.34 | 156 | 8.63 |
| 10 | | 1369 | 721 | 1.90 | 52.67 | 161 | 8.50 |
| 11 | | 1348 | 52 | 25.92 | 3.86 | 175 | 7.70 |
| 12 | | 1414 | 52 | 27.19 | 3.68 | 177 | 7.99 |
| 13 | DATASET 3 | 1076 | 57 | 18.88 | 5.30 | 186 | 5.78 |
| 14 | | 958 | 47 | 20.38 | 4.91 | 179 | 5.35 |
| 15 | | 1100 | 54 | 20.37 | 4.91 | 168 | 6.55 |
| 16 | | 895 | 50 | 17.90 | 5.59 | 170 | 5.26 |
| 17 | | 1038 | 50 | 20.76 | 4.82 | 186 | 5.58 |
| 18 | | 957 | 49 | 19.53 | 5.12 | 185 | 5.17 |

TO FIG. 12B

1200

FIG. 12A

1220 UNIT CHANGE DESCRIPTION

| 1218 METHOD 1100 % TIME TAKEN | 1222 DEMAND ADDITION | 1224 DEMAND NeedDate CHANGE | 1226 DEMAND NeedQty CHANGE | 1228 DEMAND PRIORITY CHANGE | 1230 CAPACITY CHANGE | 1232 WIP CHANGE | 1234 FIXED OP PLAN |
|---|---|---|---|---|---|---|---|
| 13.18 | X | | | | | | |
| 6.54 | | X | | | | | |
| 6.82 | | | | X | | | |
| 142.32 | | | | | X | | |
| 6.59 | | | | | | X | |
| 7.38 | | | | | | | X |
| 11.27 | X | | | | | | |
| 11.50 | | | X | | | | |
| 11.58 | | | | X | | | |
| 11.76 | | | | | X | | |
| 12.98 | | | | | | X | |
| 12.52 | | | | | | | X |
| 17.29 | X | | | | | | |
| 18.68 | | | X | | | | |
| 15.27 | | | | X | | | |
| 18.99 | | | | | X | | |
| 17.92 | | | | | | X | |
| 19.33 | | | | | | | X |

FROM FIG. 12A

FIG. 12B

| EXP. NO. (1302) | DATASET (1304) | METHOD 400 RunTime (IN SECS) (1306) | METHOD 1100 RunTime (IN SECS) (1308) | METHOD 1100 X TIMES IMPROV (1310) | METHOD 1100 % TIME TAKEN (1312) | WIP CHANGE (1314) |
|---|---|---|---|---|---|---|
| 1 | DATASET A | 1571 | 451 | 3.5 | 28.7 | Day1 WIPs CARRIED FORWARD TO Day2. Day2 WIPs SET TO ZERO |
| 2 | | 1402 | 555 | 2.5 | 39.6 | Day1 WIPs CARRIED FORWARD TO Day2 AFTER SCALING BY 100%-105%-110% WITH EQUAL DISTRIBUTION. Day2 WIPs SET TO ZERO |
| 3 | | 1779 | 709 | 2.5 | 39.9 | Day1 WIPs CARRIED FORWARD TO Day2 AFTER SCALING BY 100%-105%-110% WITH EQUAL DISTRIBUTION. Day2 WIPs SET TO ZERO |
| 4 | | 1581 | 551 | 2.9 | 34.9 | Day1 WIPs CARRIED FORWARD TO Day2 AFTER SCALING BY 100%-105%-110% WITH EQUAL DISTRIBUTION. Day2 WIPs SET TO ZERO |
| 5 | DATASET B | 958 | 242 | 4.0 | 25.3 | Day1 WIPs CARRIED FORWARD TO Day2. Day2 WIPs SET TO ZERO |
| 6 | | 869 | 525 | 1.7 | 60.4 | Day1 WIPs CARRIED FORWARD TO Day2 AFTER SCALING BY 100%-105%-110% WITH EQUAL DISTRIBUTION. Day2 WIPs SET TO ZERO |
| 7 | | 951 | 462 | 2.1 | 48.6 | Day1 WIPs CARRIED FORWARD TO Day2 AFTER SCALING BY 100%-105%-110% WITH EQUAL DISTRIBUTION. Day2 WIPs SET TO ZERO |
| 8 | | 1001 | 528 | 1.9 | 52.7 | Day1 WIPs CARRIED FORWARD TO Day2 AFTER SCALING BY 100%-105%-110% WITH EQUAL DISTRIBUTION. Day2 WIPs SET TO ZERO |
| 9 | DATASET C | 17439 | 710 | 24.6 | 4.1 | Day1 WIPs CARRIED FORWARD TO Day2. Day2 WIPs SET TO ZERO |
| 10 | | 14091 | 1018 | 13.8 | 7.2 | Day1 WIPs CARRIED FORWARD TO Day2 AFTER SCALING BY 100%-105%-110% WITH EQUAL DISTRIBUTION. Day2 WIPs SET TO ZERO |
| 11 | | 15008 | 1016 | 14.8 | 6.8 | Day1 WIPs CARRIED FORWARD TO Day2 AFTER SCALING BY 100%-105%-110% WITH EQUAL DISTRIBUTION. Day2 WIPs SET TO ZERO |

TO FIG. 13B

FIG. 13A

1300

| 1316 DEMAND CHANGE | 1318 OPERATION PLAN CHANGE |
|---|---|
| Day2 DEMANDS' NeedQty RANDOMLY CHANGED TO 0%-50%-55%-65%-70%-120% WITH EQUAL DISTRIBUTION | Day1 OPERATION PLANS SET TO ZERO |
| Day2 DEMANDS' NeedQty RANDOMLY CHANGED TO 10%-20%-30%-40%-50%-80% WITH EQUAL DISTRIBUTION | Day1 OPERATION PLANS SET TO ZERO |
| Day2 DEMANDS' NeedQty RANDOMLY CHANGED TO 0%-90%-100%-120%-140%-160% WITH EQUAL DISTRIBUTION | Day1 OPERATION PLANS SET TO ZERO |
| Day2 DEMANDS' NeedQty RANDOMLY CHANGED TO 0%-60%-70%-80%-90%-110% WITH EQUAL DISTRIBUTION | Day1 OPERATION PLANS SET TO ZERO |
| Day2 DEMANDS' NeedQty RANDOMLY CHANGED TO 0%-50%-55%-65%-70%-120% WITH EQUAL DISTRIBUTION | Day1 OPERATION PLANS SET TO ZERO |
| Day2 DEMANDS' NeedQty RANDOMLY CHANGED TO 10%-20%-30%-40%-50%-80% WITH EQUAL DISTRIBUTION | Day1 OPERATION PLANS SET TO ZERO |
| Day2 DEMANDS' NeedQty RANDOMLY CHANGED TO 0%-90%-100%-120%-140%-160% WITH EQUAL DISTRIBUTION | Day1 OPERATION PLANS SET TO ZERO |
| Day2 DEMANDS' NeedQty RANDOMLY CHANGED TO 0%-60%-70%-80%-90%-110% WITH EQUAL DISTRIBUTION | Day1 OPERATION PLANS SET TO ZERO |
| Day2 DEMANDS' NeedQty RANDOMLY CHANGED TO 0%-50%-55%-65%-70%-120% WITH EQUAL DISTRIBUTION | Day1 OPERATION PLANS SET TO ZERO |
| Day2 DEMANDS' NeedQty RANDOMLY CHANGED TO 10%-20%-30%-40%-50%-80% WITH EQUAL DISTRIBUTION | Day1 OPERATION PLANS SET TO ZERO |
| Day2 DEMANDS' NeedQty RANDOMLY CHANGED TO 0%-90%-100%-120%-140%-160% WITH EQUAL DISTRIBUTION | Day1 OPERATION PLANS SET TO ZERO |

FROM FIG. 13A

FIG. 13B

SYSTEMS AND METHODS FOR EFFICIENTLY UPDATING SOLUTIONS TO MULTI-OBJECTIVE HIERARCHICAL LINEAR PROGRAMMING PROBLEMS

CROSS-REFERENCE TO RELATED APPLICATIONS

This application is a continuation of U.S. patent application Ser. No. 16/700,390, filed Dec. 2, 2019, entitled "Systems and Methods for Efficiently Updating Solutions to Multi-Objective Hierarchical Linear Programming Problems," which claims the benefit under 35 U.S.C. § 119(e) to U.S. Provisional Application No. 62/839,311, filed Apr. 26, 2019, entitled "Systems and Methods for Efficiently Updating Solutions to Multi-Objective Hierarchical Linear Programming Problems" and U.S. Provisional Application No. 62/802,794, filed Feb. 8, 2019, entitled "Systems and Methods for Efficiently Updating Solutions to Multi-Objective Hierarchical Linear Programming Problems." U.S. patent application Ser. No. 16/700,390, U.S. Provisional Application No. 62/839,311, and U.S. Provisional Application No. 62/802,794 are assigned to the assignee of the present application.

TECHNICAL FIELD

The present disclosure relates generally to supply chain planning and specifically to solving supply chain planning problems modeled as multi-objective hierarchical linear programming problems.

BACKGROUND

During supply chain planning, a supply chain plan may be generated by solving a supply chain planning problem modeled as a single- or multi-objective linear programming problem (LPP). For example, a supply chain planner may model a master production problem as a multi-objective hierarchical LPP. The supply chain planner may update and re-solve the supply chain planning problem from time-to-time when changes occur in the supply chain. However, even when there are few changes to the supply chain and these changes are known, re-solving the supply chain planning problem may take as much time to solve as the initial supply chain planning problem. This inefficiency to re-solve a previously-solved supply chain problem when there are only a few known changes to a supply chain is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 6 illustrates a chart of changes to a supply chain and a supply chain planning problem and the resultant effect on retaining primal or dual feasibility, in accordance with an embodiment;

FIG. 12 (depicted as FIGS. 12A and 12B) illustrates chart results of solving multi-objective hierarchical LPP with micro-changes between a base run and a current run, in accordance with an embodiment; and FIG. 13 (depicted as FIGS. 13A and 13B) illustrates a chart of results with macro-changes between a base run and a current run, in accordance with an embodiment.

DETAILED DESCRIPTION

Figure 1:
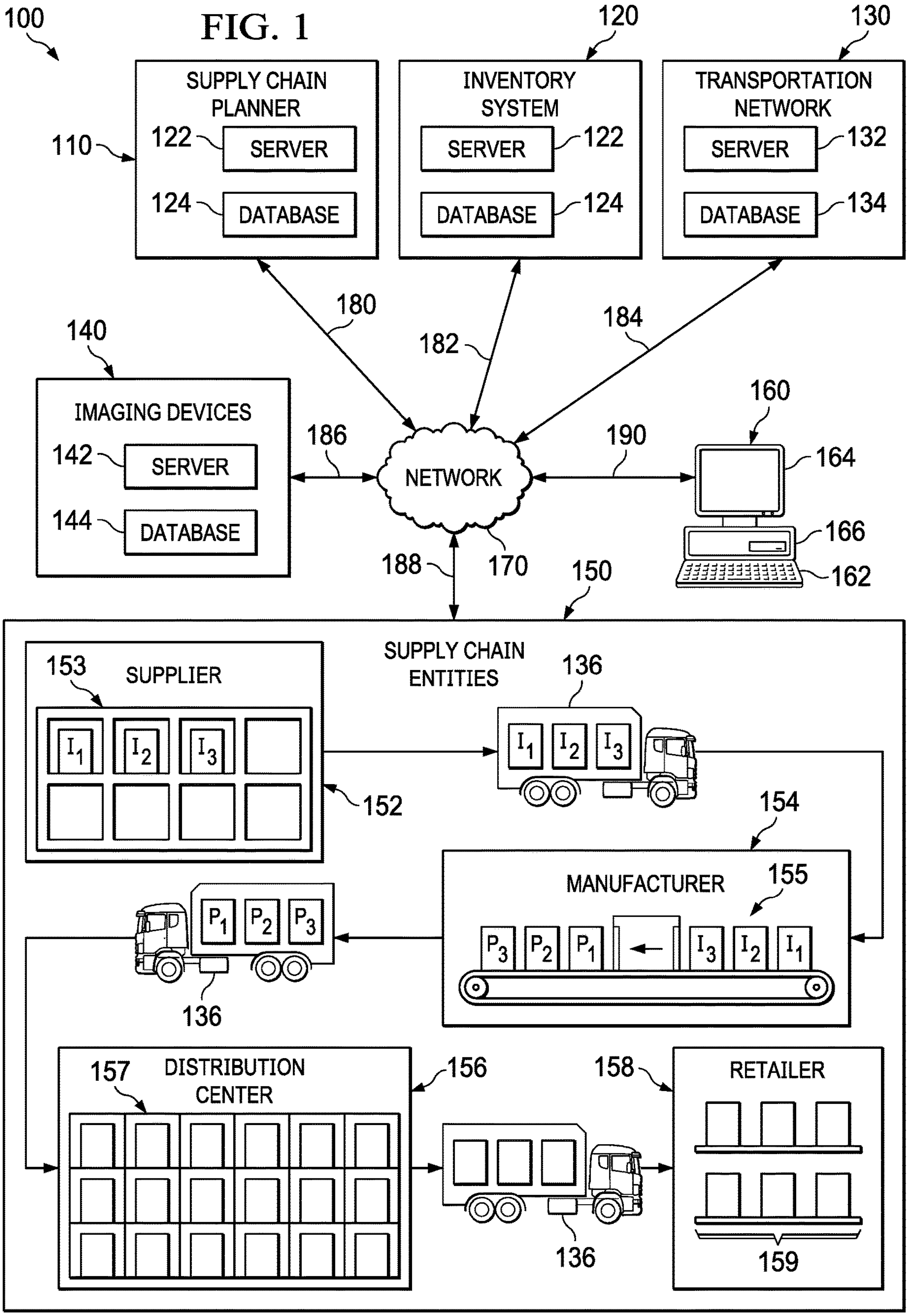
FIG. 1 illustrates an exemplary supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates an exemplary supply chain network, in accordance with a first embodiment. Supply chain network 100 comprises supply chain planner 110, inventory system 120, transportation network 130, one or more imaging devices 140, one or more supply chain entities 150, computer 160, network 170, and communication links 180-190. Although a single supply chain planner 110, a single inventory system 120, a single transportation network 130, one or more imaging devices 140, one or more supply chain entities 150, a single computer 160, a single network 170, and one or more communication links 180-190 are shown and described, embodiments contemplate any number of supply chain planners, inventory systems, transportation networks, imaging devices, supply chain entities, computers, networks, and communication links, according to particular needs.

In one embodiment, supply chain planner 110 comprises server 112 and database 114. Server 112 comprises one or more modules that model, generate, and solve a supply chain planning problem to produce a supply chain plan as a solution to a multi-objective LPP. According to embodiments, solver 204 (FIG. 2) of supply chain planner 110 uses solution information from a previous solving run of a multi-objective hierarchical LPP to increase the efficiency a subsequent solving run of the multi-objective hierarchical linear programming problem. As described in more detail herein, solver 204 solves a lower-priority objective using the optimal basis and a list of variables to be fixed at their upper and lower bounds generated during the solve of a higher-priority objective.

In addition, solver 204 uses the optimal basis and the list of variables generated from an earlier solving run of the multi-objective hierarchical LPP during a later solving run of the same multi-objective hierarchical LPP having changes to supply chain input data 210. After solving for each of the multiple objectives (representing one or more business objectives), the final mathematical solution of the multi-objective hierarchical LPP, when converted to a supply chain, represents an optimized supply chain plan. Initially, a supply chain planning problem may be converted into a multi-objective linear programming problem wherein the mathematical constraints, objectives, and bounds on variables of the supply chain planning problem is mapped to mathematical expressions in the multi-objective linear programming problem. After solving, the mapping of this conversion may be used to translate the solution of the multi-objective LPP to a supply chain plan.

Inventory system 120 comprises server 122 and database 124. Server 122 of inventory system 120 is configured to receive and transmit item data, including item identifiers, pricing data, attribute data, inventory levels, and other like data about one or more items at one or more locations in supply chain network 100. Server 122 stores and retrieves item data from database 124 or one or more locations in supply chain network 100.

Transportation network 130 comprises server 132 and database 134. According to embodiments, transportation network 130 directs one or more transportation vehicles 136 to ship one or more items between one or more supply chain entities 150 based, at least in part, a supply chain plan or a re-allocation of materials or capacity determined by supply chain planner 110. In addition, the number of items shipped by one or more transportation vehicles 136 in transportation network 130 may also be based, at least in part, on the number of items currently in stock at one or more stocking locations of one or more supply chain entities 150, the number of items currently in transit, a forecasted demand, a supply chain disruption, and the like. One or more transportation vehicles 136 comprise, for example, any number of trucks, cars, vans, boats, airplanes, unmanned aerial vehicles (UAVs), cranes, robotic machinery, or the like. According to embodiments, one or more transportation vehicles 136 may be associated with one or more supply chain entities 150 and may be directed by automated navigation including, for example, GPS guidance, according to particular needs.

One or more imaging devices 140 comprise one or more processors 142, memory 144, one or more sensors 146, and may include any suitable input device, output device, fixed or removable computer-readable storage media, or the like. According to one embodiment, one or more imaging devices 140 comprise one or more electronic devices that may receive imaging information from one or more sensors 146 or from one or more databases in supply chain network 100. One or more imaging devices 140 may identify items near one or more sensors 146 and generate a mapping of the item in supply chain network 100. As explained in more detail below, transportation network 130 and/or one or more supply chain entities 150 use the mapping of an item to locate the item in supply chain network 100. The location of the item is then used to coordinate the storage and transportation of items in supply chain network 100 according to one or more plans generated by supply chain planner 110 and/or a reallocation of materials or capacity determined by solver 204. Plans may comprise one or more of a master supply chain plan, production plan, distribution plan, and the like.

One or more imaging devices 140 may comprise a mobile handheld device such as, for example, a smartphone, a tablet computer, a wireless device, or the like. In addition, or as an alternative, one or more imaging devices 140 comprise one or more networked electronic devices configured to transmit item identity information to one or more databases as an item passes by or is scanned by one or more sensors 146. This may include, for example, a stationary scanner located at transportation network 130 or one or more supply chain entities 150 and which identifies items as the items pass near the scanner, including, for example, in one or more transportation vehicles 136. One or more sensors 146 of one or more imaging devices 140 may comprise an imaging sensor, such as, for example, a camera, scanner, electronic eye, photodiode, charged coupled device (CCD), or any sensor that detects images, such as, for example, product images, labels, barcodes, or the like. In addition, or as an alternative, one or more sensors 146 may comprise a radio receiver and/or transmitter configured to read an electronic tag coupled with a product, such as, for example, an RFID tag.

As shown in FIG. 1, supply chain network 100 comprising supply chain planner 110, inventory system 120, transportation network 130, one or more imaging devices 140, and one or more supply chain entities 150 may operate on one or more computers 160 that are integral to or separate from the hardware and/or software that support supply chain planner 110, inventory system 120, transportation network 130, one or more imaging devices 140, and one or more supply chain entities 150. Computer 160 may include any suitable input device 162, such as a keypad, mouse, touch screen, microphone, or other device to input information. Output device 164 may convey information associated with the operation of supply chain network 100, including digital or analog data, visual information, or audio information.

Computer 160 may include fixed or removable computer-readable storage media, including a non-transitory computer-readable medium, magnetic computer disks, flash drives, CD-ROM, in-memory device or other suitable media to receive output from and provide input to supply chain network 100. Computer 160 may include one or more processors 166 and associated memory to execute instructions and manipulate information according to the operation of supply chain network 100 and any of the methods described herein. In addition, or as an alternative, embodiments contemplate executing the instructions on computer 160 that cause computer 160 to perform functions of the method. Further examples may also include articles of manufacture including tangible computer-readable media that have computer-readable instructions encoded thereon, and the instructions may comprise instructions to perform functions of the methods described herein.

Supply chain planner 110, inventory system 120, transportation network 130, one or more imaging devices 140, and one or more supply chain entities 150 may each operate on one or more separate computers 160, a network of one or more separate or collective computers 160, or may operate on one or more shared computers 160. In addition, supply chain network 100 may comprise a cloud-based computing system having processing and storage devices at one or more locations, local to, or remote from supply chain planner 110, inventory system 120, transportation network 130, one or more imaging devices 140, and one or more supply chain entities 150. In addition, each of the one or more computers 160 may be a work station, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with supply chain planner 110, inventory system 120, transportation network 130, one or more imaging devices 140, and one or more supply chain entities 150. These one or more users may include, for example, a "manager" or a "planner" handling supply chain planning and/or one or more related tasks within supply chain network 100. In addition, or as an alternative, these one or more users within supply chain network 100 may include, for example, one or more computers 160 programmed to autonomously handle, among other things, production planning, demand planning, option planning, sales and operations planning, supply chain master planning, plan adjustment after supply chain disruptions, order placement, automated warehouse operations (including removing items from and placing items in inventory), robotic production machinery (including production of items), and/or one or more related tasks within supply chain network 100.

One or more supply chain entities 150 may represent one or more suppliers 152, manufacturers 154, distribution centers 156, and retailers 158 in one or more supply chain networks 100, including one or more enterprises. One or more suppliers 152 may be any suitable entity that offers to sell or otherwise provides one or more items or components to one or more manufacturers 154. One or more suppliers 152 may, for example, receive an item from a first supply chain entity in supply chain network 100 and provide the item to another supply chain entity. Items may comprise, for example, components, materials, products, parts, supplies, or other items, that may be used to produce products. In addition, or as an alternative, an item may comprise a supply or resource that is used to manufacture the item but does not become a part of the item. One or more suppliers 152 may comprise automated distribution systems 153 that automatically transport items to one or more manufacturers based, at least in part, on a supply chain plan, a material or capacity reallocation, current and projected inventory levels, and/or one or more additional factors described herein.

One or more manufacturers 154 may be any suitable entity that manufactures at least one item. One or more manufacturers 154 may use one or more items during the manufacturing process to produce any manufactured, fabricated, assembled, or otherwise processed item, material, component, good, or product. In one embodiment, a product represents an item ready to be supplied to, for example, another one or more supply chain entities 150, such as one or more suppliers 152, an item that needs further processing, or any other item. One or more manufacturers 154 may, for example, produce and sell a product to one or more suppliers 152, another one or more manufacturers 154, distribution center 156, retailers 158, a customer, or any other suitable person or entity. One or more manufacturers 154 may comprise automated robotic production machinery 155 that produce products based, at least in part, on a supply chain plan, a material or capacity reallocation, current and projected inventory levels, and/or one or more additional factors described herein.

One or more distribution centers 156 may be any suitable entity that offers to sell or otherwise distributes at least one product to one or more retailers 158 and/or customers. One or more distribution centers 156 may, for example, receive a product from a first supply chain entity in supply chain network 100 and store and transport the product for a second supply chain entity. One or more distribution centers 156 may comprise automated warehousing systems 157 that automatically transport products to one or more retailers 158 or customers and/or automatically remove an item from, or place an item into, inventory based, at least in part, on a supply chain plan, a material or capacity reallocation, current and projected inventory levels, and/or one or more additional factors described herein.

One or more retailers 158 may be any suitable entity that obtains one or more products to sell to one or more customers. In addition, one or more retailers 158 may sell, store, and supply one or more components and/or repair a product with one or more components. One or more retailers 158 may comprise any online or brick and mortar location, including locations with shelving systems 159. Shelving systems 159 may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers 158 based on computer-generated instructions or automatically by machinery to place products in a desired location.

Although one or more suppliers 152, manufacturers 154, distribution centers 156, and retailers 158 are shown and described as separate and distinct entities, the same entity may simultaneously act as any other one or more suppliers 152, manufacturers 154, distribution centers 156, and retailers 158. For example, one or more manufacturers 154 acting as a manufacturer could produce a product, and the same entity could act as one or more suppliers 156 to supply a product to another one or more supply chain entities 150. Although one example of supply chain network 100 is shown and described, embodiments contemplate any configuration of supply chain network 100, without departing from the scope of the present disclosure.

In one embodiment, supply chain planner 110 may be coupled with network 170 using communication link 180, which may be any wireline, wireless, or other link suitable to support data communications between supply chain planner 110 and network 170 during operation of supply chain network 100. Inventory system 120 may be coupled with network 170 using communication link 182, which may be any wireline, wireless, or other link suitable to support data communications between inventory system 120 and network 170 during operation of supply chain network 100. Transportation network 130 may be coupled with network 170 using communication link 184, which may be any wireline, wireless, or other link suitable to support data communications between transportation network 130 and network 170 during operation of supply chain network 100. One or more imaging devices 140 are coupled with network 170 using communication link 186, which may be any wireline, wireless, or other link suitable to support data communications between one or more imaging devices 140 and network 170 during operation of distributed supply chain network 100. One or more supply chain entities 150 may be coupled with network 170 using communication link 188, which may be any wireline, wireless, or other link suitable to support data communications between one or more supply chain entities 150 and network 170 during operation of supply chain network 100. Computer 160 may be coupled with network 170 using communication link 190, which may be any wireline, wireless, or other link suitable to support data communications between computer 160 and network 170 during operation of supply chain network 100.

Although the communication links 180-190 are shown as generally coupling supply chain planner 110, inventory system 120, transportation network 130, one or more imaging devices 140, one or more supply chain entities 150, and computer 160 to network 170, each of supply chain planner 110, inventory system 120, transportation network 130, one or more imaging devices 140, one or more supply chain entities 150, and computer 160 may communicate directly with each other, according to particular needs.

In another embodiment, network 170 includes the Internet and any appropriate local area networks (LANs), metropolitan area networks (MANs), or wide area networks (WANs) coupling supply chain planner 110, inventory system 120, transportation network 130, one or more imaging devices 140, one or more supply chain entities 150, and computer 160. For example, data may be maintained by locally or externally of supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using network 170 or in any other appropriate manner. For example, data may be maintained in a cloud database at one or more locations external to supply chain planner 110, inventory system 120, transportation network 130, one or more imaging devices 140, one or more supply chain entities 150, and computer 160 and made available to one or more associated users of supply chain planner 110, inventory system 120, transportation network 130, one or more imaging devices 140, one or more supply chain entities 150, and computer 160 using the cloud or in any other appropriate manner. Those skilled in the art will recognize that the complete structure and operation of network 170 and other components within supply chain network 100 are not depicted or described. Embodiments may be employed in conjunction with known communications networks and other components.

In accordance with the principles of embodiments described herein, supply chain planner 110 may reallocate inventory of one or more items among demands or orders of one or more supply chain entities 150. In addition, the one or more computers 160 associated with supply chain network 100 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on current inventory, production levels, and/or one or more other factors described herein. For example, the methods described herein may include computers 160 receiving product data from automated machinery having at least one sensor and product data 214 corresponding to an item detected by the automated machinery. Received product data 214 may include an image of the item, an identifier, as described above, and/or other data associated with the item, including, for example, dimensions, texture, estimated weight, and the like.

According to embodiments, the methods may further include computers 160 looking up received product data 214 in a database system associated with supply chain planner 110 to identify the item corresponding to product data 214 received from automated machinery. Based on the identification of the item, computers 160 may also identify (or alternatively generate) a first mapping in the database system, where the first mapping is associated with the current location of the identified item. Computers 160 may also identify a second mapping in the database system, where the second mapping is associated with a past location of the identified item. Computers 160 may also compare the first mapping and the second mapping to determine if the current location of the identified item in the first mapping is different than the past location of the identified item in the second mapping. Computers 160 may then send instructions to the automated machinery based, as least in part, on one or more differences between the first mapping and the second mapping such as, for example, to locate items to add to or remove from an inventory of or shipment for one or more supply chain entities 150. In addition, or as an alternative, supply chain planner 110 monitors one or more supply chain constraints of one or more items at one or more supply chain entities 150 and adjusts the orders and/or inventory of one or more supply chain entities 150 at least partially based on one or more supply chain constraints.

Figure 2:
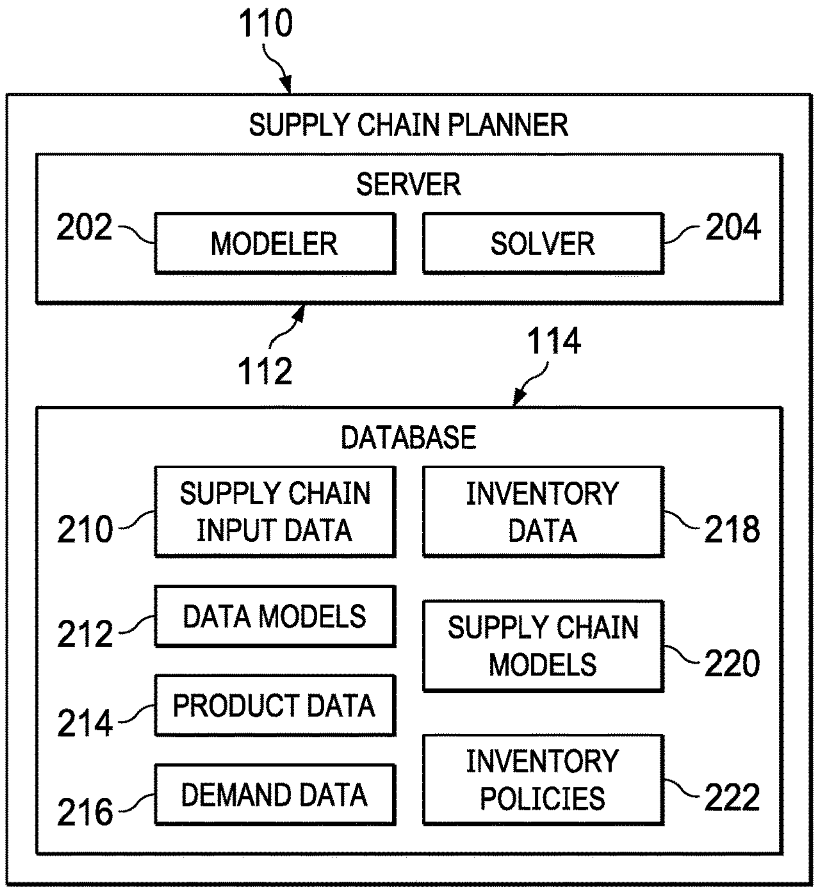
FIG. 2 illustrates the supply chain planner of FIG. 1 in greater detail, in accordance with an embodiment.

FIG. 2 illustrates supply chain planner 110 of FIG. 1 in greater detail, in accordance with an embodiment. As discussed above, supply chain planner 110 comprises server 112 and database 114. Although supply chain planner 110 is shown as comprising a single server 112 and a single database 114, embodiments contemplate any suitable number of servers or databases internal to or externally coupled with supply chain planner 110.

Database 114 of supply chain planner 110 may comprise one or more databases or other data storage arrangement at one or more locations, local to, or remote from, server 112. Database 114 comprises, for example, supply chain input data 210, data models 212, product data 214, demand data 216, inventory data 218, supply chain models 220, and inventory policies 222. Although, database 114 is shown and described as comprising supply chain data 210, data models 212, product data 214, demand data 216, inventory data 218, supply chain models 220, and inventory policies 222, embodiments contemplate any suitable number or combination of these, located at one or more locations, local to, or remote from, supply chain planner 110 according to particular needs.

As an example only and not by way of limitation, database 114 stores supply chain input data 210, including one or more supply chain planning problems of supply chain network 100 that may be used by supply chain planner 110 and/or solver 204. Supply chain input data 210 may comprise for example, various decision variables, business constraints, goals, and objectives of one or more supply chain entities 150. According to some embodiments, supply chain input data 210 may comprise hierarchical objectives specified by, for example, business rules, master planning requirements, scheduling constraints, and discrete constraints, including, for example, sequence dependent setup times, lot-sizing, storage, shelf life, and the like.

Data models 212 represent the flow of materials through one or more supply chain entities 150 of supply chain network 100. Modeler 202 of supply chain planner 110 may model the flow of materials through one or more supply chain entities 150 of supply chain network 100 as one or more data models 212 comprising, for example, a network of nodes and edges. Material storage and/or transition units may be modeled as nodes, which may be referred to as buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modeled as edges connecting the nodes. Each edge may represent the flow, transportation, or assembly of materials (such as items or resources) between the nodes by, for example, production processing or transportation. A planning horizon for the data models 212 may be broken down into elementary time-units, such as, for example, time-buckets, or, simply, buckets. The edge between two buffer nodes denote processing of material and the edge between different buckets for the same buffer indicates inventory carried forward. Flow-balance constraints for most, if not every buffer in every bucket, model the material movement in supply chain network 100.

Product data 214 of database 114 may comprise one or more data structures for identifying, classifying, and storing data associated with products, including, for example, a product identifier (such as a Stock Keeping Unit (SKU), Universal Product Code (UPC), or the like), product attributes and attribute values, sourcing information, and the like. Product data 214 may comprise data about one or more products organized and sortable by, for example, product attributes, attribute values, product identification, sales quantity, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, fill level, color, and the like).

Demand data 216 of database 114 may comprise, for example, any data relating to past sales, past demand, purchase data, promotions, events, or the like of one or more supply chain entities 150. Demand data 216 may cover a time interval such as, for example, by the minute, hour, daily, weekly, monthly, quarterly, yearly, or any suitable time interval, including substantially in real time. According to embodiments, demand data 216 may include historical demand and sales data or projected demand forecasts for one or more retail locations, customers, regions, or the like of one or more supply chain entities 150 and may include historical or forecast demand and sales segmented according to product attributes, customers, regions, or the like.

Inventory data 218 of database 114 may comprise any data relating to current or projected inventory quantities or states, order rules, or the like. For example, inventory data 218 may comprise the current level of inventory for each item at one or more stocking locations across supply chain network 100. In addition, inventory data 218 may comprise order rules that describe one or more rules or limits on setting an inventory policy, including, but not limited to, a minimum order quantity, a maximum order quantity, a discount, a step-size order quantity, and batch quantity rules. According to some embodiments, supply chain planner 110 accesses and stores inventory data 218 in database 114, which may be used by supply chain planner 110 to place orders, set inventory levels at one or more stocking points, initiate manufacturing of one or more items (or components of one or more items), or the like. In addition, or as an alternative, inventory data 218 may be updated by receiving current item quantities, mappings, or locations from inventory system 120, transportation network 130, one or more imaging devices 140, and/or one or more supply chain entities 150.

Supply chain models 220 of database 114 may comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). Additionally, or in the alternative, supply chain models 220 may comprise characteristics that specify the supply chain structure in even more detail, including, for example, specifying the type of collaboration with the customer (e.g. Vendor-Managed Inventory (VMI)), from which stocking locations or suppliers items may be sourced, customer priorities, demand priorities, how products may be allocated, shipped, or paid for, by particular customers, and the destination stocking locations or one or more supply chain entities 150 where items may be transported. Each of these characteristics may lead to different supply chain models 220.

Inventory policies 222 of database 114 may comprise any suitable inventory policy describing the reorder point and target quantity, or other inventory policy parameters that set rules for supply chain planner 110 to manage and reorder inventory. Inventory policies 222 may be based on target service level, demand, cost, fill rate, or the like. According to embodiment, inventory policies 222 comprise target service levels that ensure that a service level of one or more supply chain entities 150 is met with a certain probability. For example, one or more supply chain entities 150 may set a target service level at 95%, meaning one or more supply chain entities 150 will set the desired inventory stock level at a level that meets demand 95% of the time. Although, a particular target service level and percentage is described; embodiments contemplate any target service level, for example, a target service level of approximately 99% through 90%, 75%, or any target service level, according to particular needs. Other types of service levels associated with inventory quantity or order quantity may comprise, but are not limited to, a maximum expected backlog and a fulfillment level. Once the service level is set, supply chain planner 110 may determine a replenishment order according to one or more replenishment rules, which, among other things, indicates to one or more supply chain entities 150 to determine or receive inventory to replace the depleted inventory.

Server 112 of supply chain planner 110 may comprise modeler 202 and solver 204. Although server 112 is shown and described as comprising a single modeler 202 and a single solver 204, embodiments contemplate any suitable number or combination of these located at one or more locations, local to, or remote from supply chain planner 110, such as on multiple servers or computers at any location in supply chain network 100.

According to embodiments, modeler 202 of server 112 identifies resources, operations, buffers, and pathways, and maps supply chain network 100 using data models 212, as described in more detail below. In one embodiment, modeler 202 maps optional resources and material as primary and alternate pathways. In addition, or in the alternative, modeler 202 generates a supply chain planning problem to represent the flow of materials through supply chain network 100.

According to embodiments, solver 204 of supply chain planner 110 solves a supply chain planning problem as an LPP comprising three components: objectives, constraints, and bounds. According to embodiments, objectives of a multi-objective LPP represent business objectives (such as, for example, minimizing total inventory, maximizing profits, etc.), constraints comprise limitations to capacity, materials, lead times, and the like, and bounds comprise maximum and/or minimum values for decision variables (such as, for example, capacity can only be used for ten hours per day, then ten hours may be the upper bound on the capacity usage).

Figure 3:
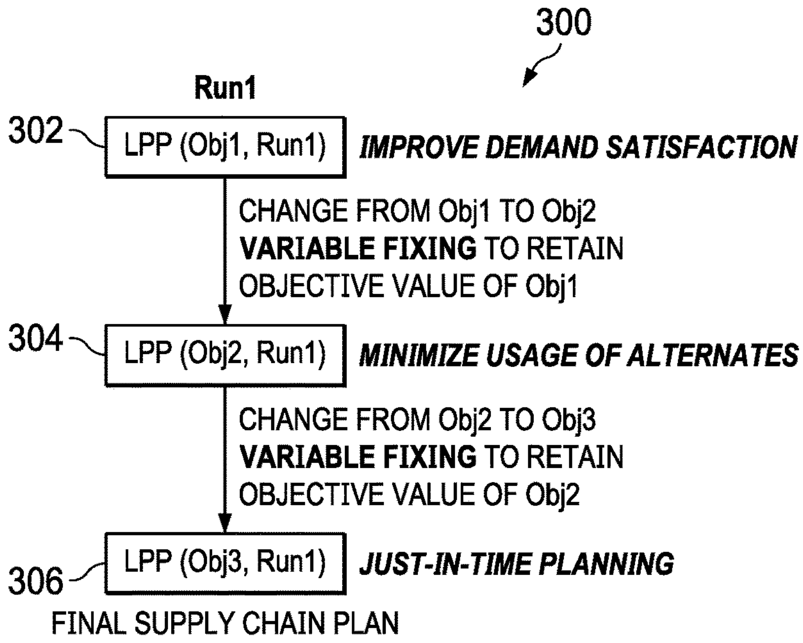
FIG. 3 illustrates a base run of a multi-objective hierarchical LPP, in accordance with an embodiment.

FIG. 3 illustrates base run 300 of a multi-objective hierarchical LPP, in accordance with an embodiment. Base run (Run1) 300 comprises solutions 302-306 of the multi-objective hierarchical LPP for each of three objectives: base run solution of LPP for first objective (Obj1) 302; base run solution of LPP for second objective (Obj2) 304; and base run solution of LPP for third objective (Obj3) 306. In this example, Obj1 comprises improve demand satisfaction, which may be represented by an objective function that minimizes the quantity of unmet demand. Obj2 comprises maximizing usage of primary resources, which may be represented by an objective function that minimizes usage of alternate resources. By way of a further example, Obj3 comprises planning items as just-in-time (JIT) as possible, which may be represented by an objective function that minimizes the quantity of carried-over items. Although exemplary objectives and objective functions are shown and described, embodiments contemplate any objective represented by minimizing or maximizing any suitable objective function, according to particular needs.

As described in more detail herein, embodiments of solver 204 of supply chain planner 110 may solve a multi-objective hierarchical LPP by iteratively loading and solving the LPP for each objective in accordance with an order described by a hierarchy of the objectives. A hierarchy of the objectives indicates that the hierarchical objectives are solved in the order indicated by the hierarchy, from an objective higher in the hierarchy (higher order or higher priority objective) to an objective lower in the hierarchy (lower order or lower priority objective). The hierarchical order of the objectives may indicate the order of importance of the objectives (i.e. the first objective is more important than the second objective; the second objective is more important than the third objective etc.). When solving the LPP for one or more lower objectives, solver 204 sets decision variables at their upper or lower bounds (which may be referred to as variable fixing) to retain the objective value of one or more higher objectives. In addition, or in the alternative, solver 204 may use, as a starting basis, the optimal basis of the solution of the LPP for the preceding higher objective when solving for a lower objective. After solving the LPP for a current objective, solver 204 updates the list of the variable to be fixed at their upper or lower bounds based on the solution to the current objective. Solver 204 may then iteratively repeat solving the LPP for each objective following this technique until solver 204 solves all objectives of the multi-objective hierarchical LPP, as described below.

According to embodiments, solver 204 uses a primal simplex method and/or a dual simplex method to solve each objective of an LPP by going from one basis to the next, iteratively, until reaching an optimal basis that is linked to a unique optimal solution of the LPP for the current objective. The optimal basis is both primal-feasible and dual-feasible. Primal-infeasible and dual-infeasible refer to the performance of a particular starting basis when solving an LPP with a primal simplex method or a dual simplex method, as described below. When using a primal simplex method, solver 204 searches for a primal feasible basis (which may be dual infeasible) and then transforms the found primal feasible basis to another primal feasible basis, iteratively, until solver 204 identifies a primal feasible basis that is also the optimal basis. When using a dual simplex method, solver 204 searches for a dual feasible basis (which may be primal infeasible), and then transforms the found dual feasible basis to another dual feasible basis, iteratively, until solver 204 identifies a dual feasible basis that is also the optimal basis. Solver 204 uses a primal simplex method and a dual simplex method to solve an LPP by going from one basis to the next, iteratively, until reaching an optimal basis that is linked to a unique optimal solution of an LPP, which is both primal-feasible and dual-feasible.

Figure 4:
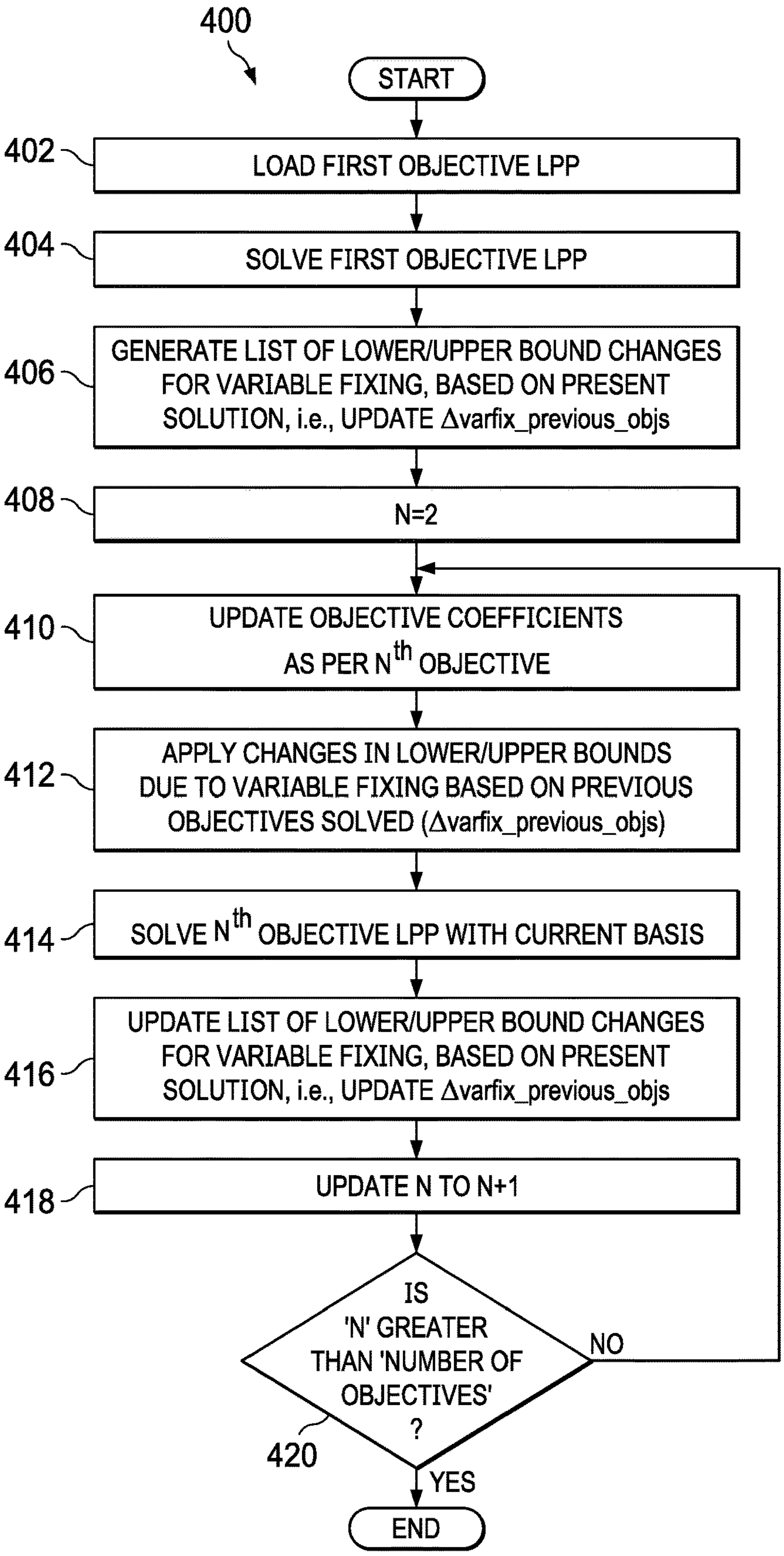
FIG. 4 illustrates an exemplary method to solve a multi-objective hierarchical LPP, in accordance with an embodiment.

FIG. 4 illustrates exemplary method 400 to solve a multi-objective hierarchical LPP, in accordance with an embodiment. Exemplary method 400 proceeds by one or more activities, which although described in a particular order may be performed in one or more permutations, according to particular needs.

Method 400 begins at action 402, where supply chain planner 110 loads into memory a supply chain planning problem comprising an LPP and the first objective of the multiple objectives. As stated above, a hierarchical multi-objective LPP comprises two or more hierarchical objective functions that represent two or more hierarchical business objectives, one or more mathematical constraints that represent one or more supply chain constraints (such as, for example, material, capacity, lead time constraints, etc.), one or more decision variables that represent supply chain inputs. By way of further explanation and not of limitation, a non-limiting example of method 400 is given in connection with Run1 300 of FIG. 3. As stated above Run1 300 comprises solutions 302-306, comprising the solutions of the LPP for each of three objectives (Obj1, Obj2, and Obj3): base run solution of LPP for Obj1 302; base run solution of LPP for Obj2 304; and base run solution of LPP for Obj3 306. Describing method 400 in connection with this example, at this action, supply chain planner 110 loads the LPP with Obj1, comprising demand satisfaction, into memory of supply chain planner 110.

At action 404, solver 204 of supply chain planner 110 solves the LPP for the first objective. Solver 204 solves the LPP for the first objective using, for example, the primal simplex method or the dual simplex method. Although solver 204 is described as a particular solver using the primal simplex method or the dual simplex method, embodiments contemplate any suitable LPP solver using one or more solving methods, such as, for example, a primal simplex method, a dual simplex method, a barrier method, and the like.

At action 406, solver 204 generates lower and upper bound changes for variable fixing, based on the solution of the first LPP. To ensure that the first objective will not be degraded by solving the next objective, solver 204 may fix one or more variables to an upper bound or a lower bound. Continuing with the example of FIG. 3, variable fixing ensures that base run solution of LPP for Obj1 302 is not degraded when solving the LPP for Obj2 and generating base run solution of LPP for Obj2 304.

During variable fixing, solver 204 fixes particular variables to their upper or lower bounds according to a list that is updated after each objective solve. Generally, variables which can deteriorate an objective value are fixed at their lower bounds, variables which can improve an objective value are fixed at their upper bounds, and variables which are neutral remain unfixed. Upon solving the LPP, of solver 204 generates, as part of the solution data, a reduced cost of each variable. In the case of a minimization objective, when a variable has a positive reduced cost, then it will deteriorate the objective and hence be fixed to its lower bound, while a variable with a negative reduced cost will improve the objective value and hence be fixed to its upper bound. By way of further explanation, simplified examples of variable fixing are given in connection with an LPP having the exemplary first, second, and third objectives (Obj1, Obj2, and Obj3), described above. In this example, a first variable 'met quantity of a Customer1 demand' has a negative reduced cost for the objective function of Obj1 (minimizing the quantity of unmet demand) because increasing the value of the variable improves the objective. A second variable 'met quantity of a Customer2 demand' has a neutral reduced cost for the objective function of Obj1 (minimizing the quantity of unmet demand) because changing the value of the variable has no effect on the objective. Accordingly, after solving the LPP for the first objective and prior to solving for the second objective, solver 204 fixes the first variable to its upper bound, while the second variable remains unbounded.

Continuing with this example, third variable 'capacity utilization of an alternate resource' has a positive reduced cost for the objective function of Obj2 (minimizing usage of alternate resources) because increasing the value of the variable deteriorates the objective. After solving the LPP for the second objective and prior to solving for the third objective, solver 204 fixes the third variable to its lower bound. The above-described exemplary variables and objectives are simplified examples where the effect of the variable on the objective value is direct, and the deteriorating, improving, or neutral effect of the variable on the objective value is apparent. However, most variables of an LPP indirectly affect the objective value, and the deteriorating, improving, or neutral effect of the variable on the objective value is not apparent. By way of example only and not of limitation, a resource-related variable would indirectly affect a demand satisfaction objective. By checking if the reduced cost is positive, negative, or neutral, supply chain planner 110 determines whether the effect is deteriorating, improving, or neutral. In the case of a maximization objective, a positive reduced cost improves while a negative reduced cost deteriorates; hence a variable with a positive reduced cost is fixed at its upper bound and a variable with a negative reduced cost is fixed at its lower bound. In both cases, no fixing is done for a variable with a zero (or negligible) reduced cost.

According to an embodiment, supply chain planner 110 selects a variable fixing tolerance value to set a range of a reduced costs that solver 204 determines to be negligible. In one embodiment, the range of reduced cost that solver 204 determines to be negligible extends from a negative value of the variable fixing tolerance value to a positive value of the variable fixing tolerance value. By way of example only and not of limitation, when supply chain planner 110 sets a variable fixing tolerance value to 0.0001, solver 204 determines a reduced cost between −0.0001 and 0.0001 is negligible, a reduced cost greater than 0.0001 is positive, and a reduced cost less than −0.0001 is negative. Although the variable fixing tolerance value is described as defining a range extending from −0.0001 to 0.0001, embodiments contemplate any suitable range of values for setting a negligible reduced cost having any suitable positive value and any suitable negative value, according to particular needs.

At action 408, a counter is set at N=2. According to embodiments, the counter represents the current iteration of solves of the multi-objective hierarchical LPP. After supply chain planner 110 loads and solves the LPP and generates a list of lower and upper bound changes for the first objective, the counter is set at N=2 and the supply chain planner continues to action 410, where solver 204 updates the objective coefficients according to the Nth objective.

Continuing with the previous example where the counter has increased to N=2, the Nth objective comprises a mathematical representation of the second objective in the hierarchy of objectives, Obj2, which comprises maximizing usage of primary resources, as discussed above. As the counter is increased further during a further iteration, as described below, the Nth objective represents the next objective in the order of the hierarchy (e.g. N=3, solver 204 updates the objective coefficients according to Obj3, the $3^{rd}$ objective, which comprises planning items as just-in-time (JIT) as possible. According to embodiments, as the counter is increased further, as described below, the Nth objective represents the next objective in the order of the hierarchy N=4, solver 204 updates the objective coefficients according to the $4^{th}$ objective, etc.).

At action 412, solver 204 applies the changes to the lower and upper bounds according to variable fixing based on the previous objectives solved. At this action, after changing the objective of the LPP, solver 204 fixes variables at their lower or upper bounds according to the list of variable fixes to prevent degradation of the solution in regard to the first objective. As stated above, variables which can deteriorate an objective value are fixed at their lower bounds, variables which can improve an objective value are fixed at their upper bounds, and variables which are neutral remain unfixed.

At action 414, solver 204 solves the LPP with the Nth objective. Continuing with the previous example where the counter has increased to N=2, supply chain planner 110 solves the second objective LPP with solver 204 using, for example, the primal simplex method or the dual simplex method. Although solver 204 is described as a particular solver using the primal simplex method or the dual simplex method, embodiments contemplate any suitable LPP solver using one or more solving methods, such as, for example, a primal simplex method, a dual simplex method, a barrier method, and the like. As described in more detail below, when solving an LPP with a lower objective with variable fixing using the primal simplex method or the dual simplex method, solver 204 may use, as a starting basis, the optimal basis of the preceding higher objective's LPP.

At action 416, solver 204 updates the list of lower and upper bounds changes for variable fixing based on the present solution. As described above, solver 204 generates a list of lower and upper bounds for variable fixing to ensure solving an objective does not degrade the solution of an earlier objective. Continuing with the previous example, after solving the second objective, solver 204 updates the list of lower and upper bounds for variable fixing to prevent degradation of the second objective when solving a third objective (e.g. base run solution of LPP for Obj2 304 is not degraded when generating base run solution of LPP for Obj3 306).

At action 418, the counter is updated to N+1 and solver 204 continues to action 420, where solver 204 determines whether the counter N is greater than the number of objectives. When the counter is greater than the number of objectives, the method ends. When the counter is not greater than the number of objectives, the method returns to action 410, where solver 204 updates the objective coefficients according to the Nth objective and continues to iteratively solve the multi-objective hierarchical LPP for each objective by performing activities 410-420, until solver 204 determines at action 420 that Nis greater than the number of objectives, and the method ends.

Solver 204 continues to iteratively solve each objective of the LPP according to the hierarchy and fixing the lower and upper bounds to maintain the optimization of the solution until the counter N is greater than the number of objectives, as stated above. After solving each of the hierarchical objectives, solver 204 generates a solution of the multi-objective hierarchical LPP that has been optimized for each business objective represented by mathematical hierarchical objectives. The final mathematical solution when converted to a supply chain is a supply chain plan, which is optimized for all of the hierarchical objectives. The supply chain plan may represent a master production plan comprising the allocation of materials and capacity of one or more supply chain entities 150 in a supply chain network at each time bucket to produce an item in accordance with the multiple business objectives and constrained according to the supply chain input data 210. According to embodiments, the supply chain plan may change from day-to-day as the supply chain input data 210 changes.

Figure 5:
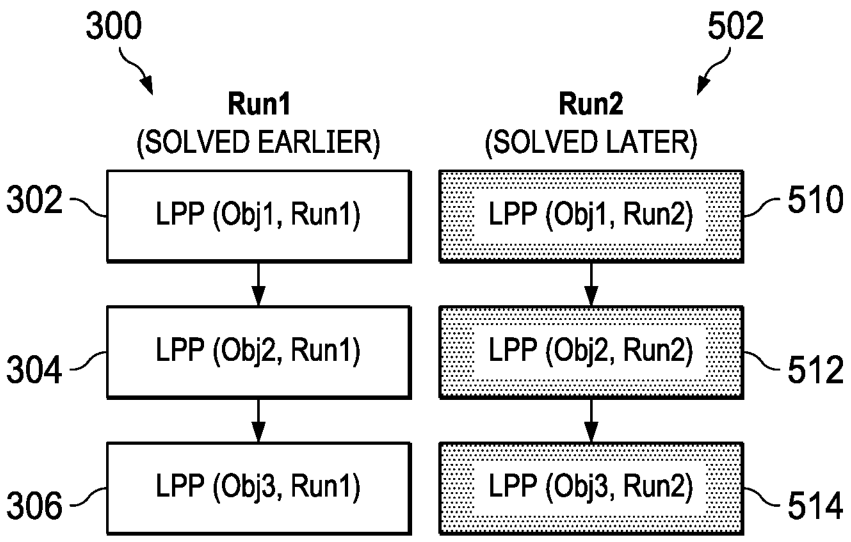
FIG. 5 illustrates two solving runs of a multi-objective hierarchical LPP, in accordance with an embodiment.

FIG. 5 illustrates two solving runs of a multi-objective hierarchical LPP, in accordance with an embodiment. According to the illustrated embodiment, a first solve of a multi-objective hierarchical LPP comprises base run 300 of FIG. 3 (Run1), which is independent of a second solve of the multi-objective hierarchical LPP (Run2) 502. As stated above Run1 300 comprises solutions 302-306, comprising the results of a solve to each of three objectives (Obj1, Obj2, and Obj3) of the hierarchical multi-objective LPP: solution of LPP for Obj1 302; solution of LPP for Obj2 304; and solution of LPP for Obj3 306. Run2 502 comprises a solve of the same multi-objective hierarchical LPP as base run 300 but may comprise changes to the supply chain. For example, Run2 comprises solutions 510-514, comprising the results of a solve to each of three objectives (Obj1, Obj2, and Obj3) of the hierarchical multi-objective LPP: solution of LPP for Obj1 510; solution of LPP for Obj2 512; and solution of LPP for Obj3 514. Continuing with the previously described example, Obj1 comprises improve demand satisfaction, Obj2 comprises maximizing usage of primary resources, and Obj3 comprises planning items as just-in-time (JIT) as possible. Although exemplary objectives are shown and described, embodiments contemplate any objective represented by minimizing or maximizing any suitable objective function, according to particular needs.

According to embodiments, solver 204 uses the optimal basis of Run1 300 to more efficiently solve Run2 502. However, when solver 204 uses the optimal basis of Run1 300 to solve Run 2 502, changes to supply chain input data 210 may render the LPP of Run2 502 primal-infeasible and/or dual-infeasible. Primal-infeasible and dual-infeasible refer to the performance of a particular starting basis when solving an LPP with a primal simplex method or a dual simplex method. Solver 204 uses a primal simplex method and a dual simplex method to solve an LPP by going from one basis to the next, iteratively, until reaching an optimal basis that is linked to a unique optimal solution of an LPP, which is both primal-feasible and dual-feasible. According to embodiments, solver 204 uses a primal simplex method to search for a primal feasible basis (which may be dual infeasible), and then transforms the primal feasible basis to another primal feasible basis, and continues to transform a previous primal feasible basis to a subsequent primal feasible basis until solver 204 identifies a primal feasible basis that is also the optimal basis. In addition, or in the alternative, solver 204 uses a dual simplex method to search for a dual feasible basis (which may be primal infeasible), and then solver 204 transforms the dual feasible basis to another dual feasible basis until solver 204 identifies a dual feasible basis that is also the optimal basis. Some changes to a supply chain may retain the primal feasibility or the dual feasibility of the optimal basis. Changes to the supply chain that retain primal feasibility may be referred to as ΔDF, i.e. the changes to the supply chain that make an optimal basis of a previous run (e.g. Run1 300) dual infeasible in a current run (e.g. Run2 502). Changes to supply chain that retain dual feasibility may be referred to as ΔPF, i.e. the changes to the supply chain that make an optimal basis of a previous run (e.g. Run1 300) primal infeasible in a current run (e.g. Run2 502).

In addition and as described in more detail below, when solver 204 uses a primal feasible basis as a starting basis for the primal simplex method, solver 204 receives a performance advantage in the operation of a computer system which reduces the time needed to generate a supply chain production plan. Similarly, when solver 204 uses a dual feasible basis as a starting basis for the dual simplex method, solver 204 receives a performance advantage in the operation of a computer system which reduces the time needed to generate a supply chain production plan.

As described in more detail below, a disclosed system reduces run times of subsequent solves of multi-objective hierarchical LPP, without reducing plan quality. According to some embodiments, supply chain planner 110 provides for using a solution from a previous day to solve the supply chain planning problem on the current day, running multiple solves during the same day based on input data changes, running scenarios efficiently using solution information of a base run, using a solution before lot-sizing to increase the speed of solving after lot-sizing, and increasing the speed of campaign planning. With unit supply chain changes between a base run and a new run, embodiments of the disclosed system using method 900 (FIG. 9) took less than 6% of the runtime of method 400. In addition, according to some embodiments, using method 1100 took less than 20% of the runtime of method 400. With a large number of supply chain changes between a base run and a new run, embodiments of method 1100 took 4% to 60% of the computational runtime of method 400.

FIG. 6 illustrates chart 600 of changes to a supply chain and to a supply chain planning problem and the resultant effect on retaining primal or dual feasibility, in accordance with an embodiment. Chart 600 is ordered according to serial number 602 of each functional change 604 and corresponding LPP change 606, which are classified according to their effect on primal feasibility 608 and their effect on dual feasibility 608. As described below, each functional change 604 and corresponding LPP change 606 are classified as a primal feasibility change (ΔPF), a dual feasibility change (ΔDF), both, or neither.

For example, when solver 204 receives supply chain input data 210 indicating that a functional change to the supply chain comprises a new demand, solver 204 generates the corresponding functional change to the optimal basis of a previous solving run. The changes to the optimal basis to add a new demand retain the primal feasibility of an optimal basis but alter the dual feasibility of the optimal basis. By way of a further example, a change to a demand need quantity retains the dual feasibility of the optimal basis but not the primal feasibility of the optimal basis. In addition, it should be noted that changes to a demand need date retains neither the primal nor the dual feasibility of the optimal basis. However, changes to a need date of an existing demand may be subdivided into three changes, which may be applied one-at-a-time, and for which the primal or the dual feasibility is retained for each of the sub-divided three changes. According to an embodiment, solver 204 may apply changes to the need date of an existing demand as: inclusion of a new variable and change in objective coefficient of a variable, which are ΔDF and change in need quantity of an existing demand, which is ΔPF.

When the supply chain changes from one run to the next run are divided into ΔDF and ΔPF, then solver 204 may first apply ΔDF to a first run's LPP such that the optimal basis of the first run LPP is a primal feasible starting basis and, after solving this efficiently by the primal simplex method, solver 204 may apply ΔPF to the resulting optimal basis of the primal simplex solve of the ΔDF LPP such that it retains dual feasibility and is efficiently solved by the dual simplex method.

Although solver 204 is described as adding ΔDF supply chain changes and solving using a primal simplex method followed by adding ΔPF changes and solving using a dual simplex method, embodiments contemplate adding ΔPF changes and solving using a dual simplex method followed by adding ΔDF supply chain changes and solving using a primal simplex method, according to particular needs.

Figure 7:
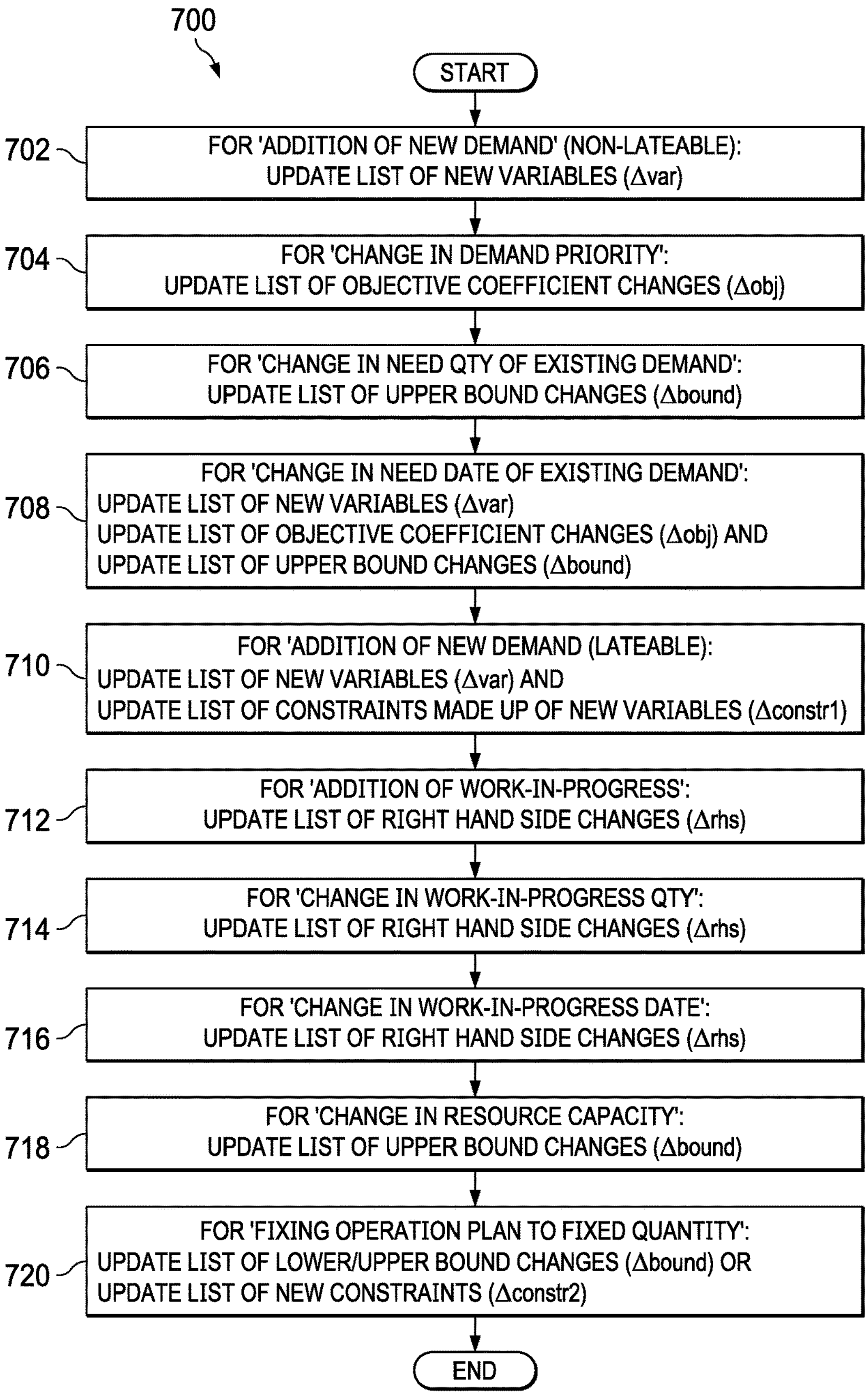
FIG. 7 illustrates a method of applying functional changes to a supply chain using corresponding LPP changes as illustrated in FIG. 6, in accordance with an embodiment.

FIG. 7 illustrates method 700 of applying functional changes to a supply chain using corresponding LPP changes as illustrated in FIG. 6, in accordance with an embodiment. Method 700 proceeds by one or more activities, which although described in a particular order may be performed in one or more permutations, according to particular needs. Additionally or in the alternative, embodiments contemplate solver 204 automatically calculating supply chain input changes by analyzing and comparing input data of a base run with input data of a new run. According to this embodiment, solver 204 may perform only the activities of method 700 corresponding to the category of the identified changes.

At action 702, solver 204 adds new non-lateable demands. According to embodiments, a functional change comprising addition of a new non-lateable demand requires solver 204 to modify the LPP to include a new variable. Changing an LPP to add a new variable is a ΔDF. At action 704, solver 204 alters a priority of a demand. According to one embodiment, functional changes comprising an altered demand priority requires solver 204 to change the objective coefficient. Changing an LPP to alter priority of a demand is a ΔDF. At action 706, solver 204 modifies a need quantity of an existing demand. According to an embodiment, changes in a need quantity of existing demand require solver 204 to change the upper bound of an existing variable, which is a ΔPF. At action 708, solver 204 modifies a need date of an existing demand. According to embodiments, solver 204 modifies a need date of an existing demand using three LPP changes: adding a new demand (as described in connection with action 702), changing a priority a demand by changing the objective coefficient of an existing demand to zero (as described in connection with action 704), and changing a need quantity of an existing demand to zero (as described in connection with action 706). By applying changes in a need date as a combination of three changes, solver 204 applies LPP changes that each comprise only a ΔPF or a ΔDF, but not both.

At action 710, solver 204 adds a new lateable demand. According to embodiments, solver 204 adds a new lateable demand by including new variables and a new constraint with only new variables, such that the new constraint is feasible when the new variables are set at zero. Addition of a new lateable demand may be categorized as a ΔDF by performing the following basis modifications so that the modified basis remains primal feasible: setting the newly added constraint at the lower bound in the starting basis; and one variable in the newly added constraint is set as a basic variable in the starting basis.

At action 712, solver 204 adds a Work-In-Progress (WIP). According to embodiments, addition of WIP requires solver 204 to change the right-hand side value of a constraint. Addition of WIP may be categorized as ΔPF. At action 714, solver 204 modifies an existing WIP quantity. According to embodiments, a change in WIP quantity requires solver to modify the right-hand side value of the constraint; this LPP change is a ΔPF. At action 716, solver 204 modifies a WIP date. According to embodiments, altering a WIP date requires solver to apply an LPP change to the right-hand side value of a constraint, which is a ΔPF.

At action 718, solver 204 modifies a capacity of a resource. According to embodiments, solver 204 changes a resource capacity by adjusting the upper bound of a variable; this LPP change is a ΔPF. At action 720, solver 204 fixes an operation plan to a fixed quantity. According to embodiments, fixing an operation plan to a fixed quantity requires solver 204 to change the lower bound and the upper bound of a variable and is a ΔPF.

Once the changes in the supply chain input data 210 are categorized as ΔDF and/or ΔPF, solver 204 may solve subsequent runs of a multi-objective hierarchical LPP by applying LPP changes 606 according to the order described in method 700 using the optimal basis of a previous runs. According to embodiments, solver 204 may more efficiently solve subsequent runs of a multi-objective hierarchical LPP by using:

(1) the optimal basis of the solution for the same objective of base run 300, as described in connection with FIGS. 8 and 9; or (2) the optimal basis of the solution for the last objective of base run 300, as described in connection FIGS. 10 and 11.

Figure 8:
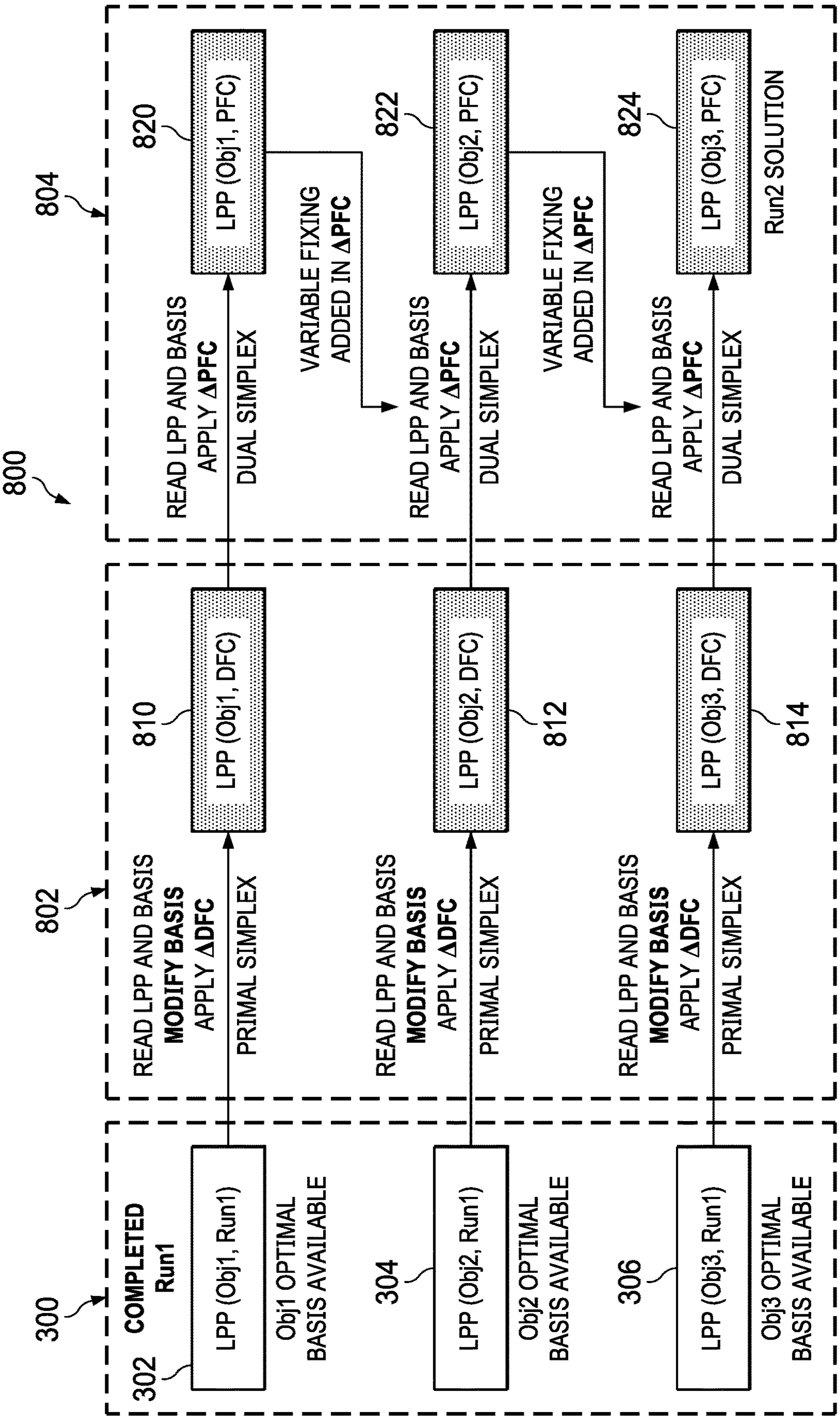
FIG. 8 illustrates a diagram of a solving a multi-objective hierarchical LPP using an optimal basis of the same objective of a previous run and categorization of supply chain changes, in accordance with an embodiment.

FIG. 8 illustrates diagram 800 of solving a multi-objective hierarchical LPP using an optimal basis of the same objective of a previous run and categorization of supply chain changes, in accordance with an embodiment. As stated above Run1 300 comprises solutions 302-306, comprising the results of a solve to each of three objectives (Obj1, Obj2, and Obj3) of the hierarchical multi-objective LPP: solution of LPP for Obj1 302; solution of LPP for Obj2 304; and solution of LPP for Obj3 306. Also, as stated above, Obj1 comprises improve demand satisfaction, Obj2 comprises maximizing usage of primary resources, and Obj3 comprises planning items as just-in-time (JIT) as possible. Although exemplary objectives are shown and described, embodiments contemplate any objective represented by minimizing or maximizing any suitable objective function, according to particular needs. According to the illustrated embodiment, base run (Run1 300) comprising a first solve of a multi-objective hierarchical LPP is independent of ΔDF run 802 and ΔPF run 804.

As described in more detail in connection with FIG. 9, solver 204 uses the optimal basis of solutions 302-306 for each objective in Run1 300 (e.g. the previous run from which the optimal basis is modified) to more efficiently solve the same objective in a current run (e.g. a subsequent run which uses, as a starting basis, the modified optimal basis of the base run). Subsequent runs may be solved more efficiently by modifying the optimal basis of solutions 302-306 of each of the objectives of the previous run to create the starting basis for the LPP solve of each objective of the ΔDF run 802 for the same objective using the primal simplex method, generating: ΔDF run solution of LPP for Obj1 810; ΔDF run solution of LPP for Obj2 812; and ΔDF run solution of LPP for Obj3 814. Solver 204 may then modify the optimal basis generated for each ΔDF solution 810-814 for ΔPF and solve the LPP for each of the same objectives during ΔPF run 804 with the dual simplex method generating: ΔPF run solution of LPP for Obj1 820; ΔPF run solution of LPP for Obj2 822; and ΔPF run solution of LPP for Obj3 824.

Figure 9:
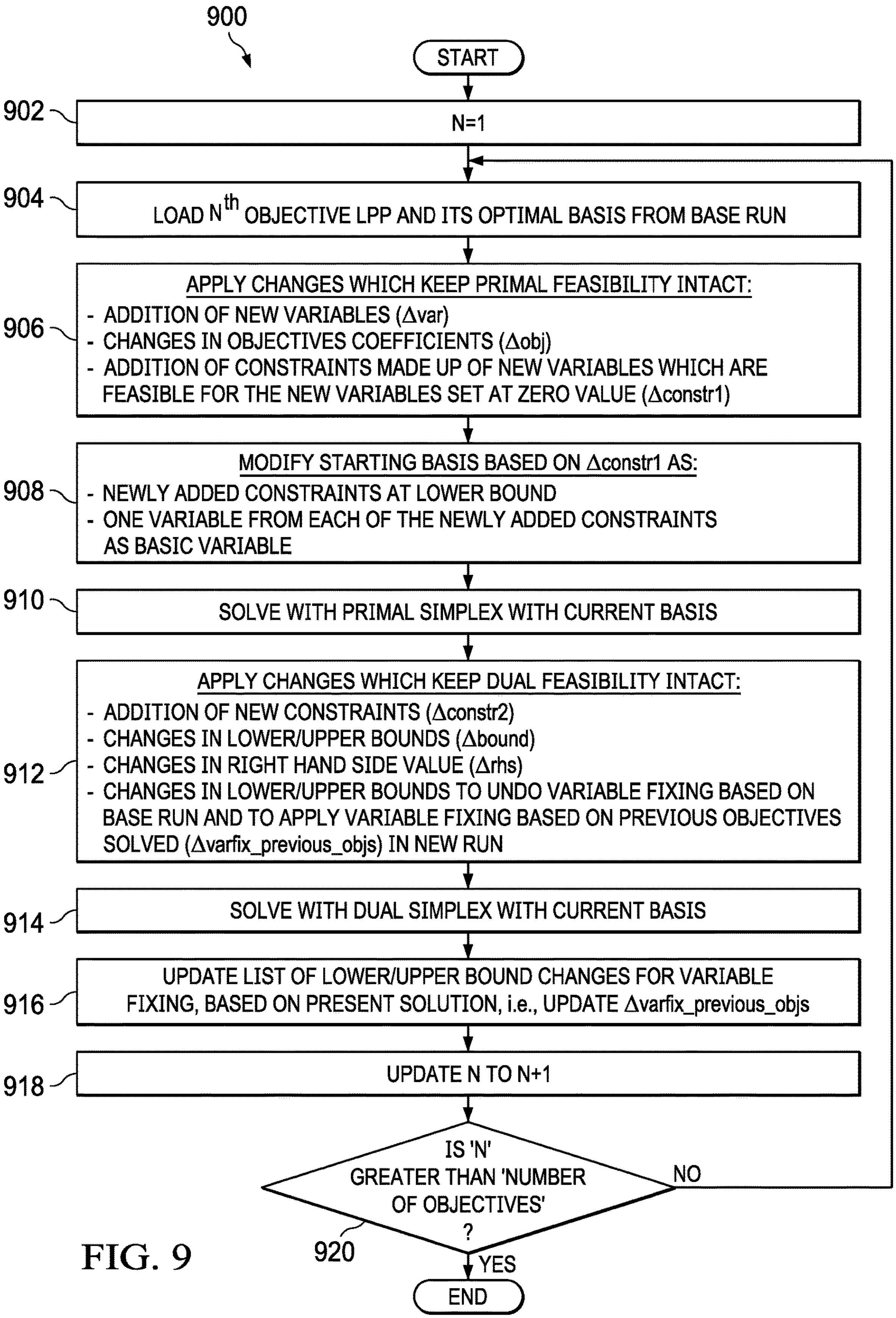
FIG. 9 illustrates a method of solving a multi-objective hierarchical LPP using an optimal basis of the same objective of a previous run and categorization of supply chain changes, in accordance with an embodiment.

By way of further explanation and not of limitation, a non-limiting example is given in connection with FIG. 9.

FIG. 9 illustrates method 900 of solving a multi-objective hierarchical LPP using an optimal basis of the same objective of a previous run and categorization of supply chain changes, in accordance with an embodiment. Method 900 of solving a multi-objective hierarchical LPP using an optimal basis of the same objective of a previous run and categorization of supply chain changes proceeds by one or more activities, which although described in a particular order may be performed in one or more permutations, according to particular needs.

Method 900 begins at action 902, where solver 204 sets a counter N equal to one. As stated above, the counter N represents the current objective level in a hierarchy of objectives of a hierarchical multi-objective LPP. At this action, solver 204 sets the counter at one and begins solving a second run of a multi-objective hierarchical LPP for the first objective based on the optimal basis of a base run.

At action 904, solver 204 loads the LPP and the optimal basis of the $N^{th}$ objective of the base run. When the counter N equals 1, the Nth objective is the first objective, and solver 204 loads the multi-objective hierarchical LPP for the first objective and the optimal basis from the solve of the first objective from the base run.

At action 906, solver 204 applies dual feasibility changes (ΔDF). As stated above, supply changes that comprise ΔDF are: addition of new variables (Δvar), changes in objective coefficients (Δobj), and addition of a constraint made up of new variables (Δconstr1). For example, as described above, addition of a new demand (non-lateable) requires addition of a new variable, changes in demand priority requires changes in the objective coefficient, and addition of a new lateable demand requires setting newly added constraints at lower bound in starting basis; and one variable in newly added constraint is set as basic variable in starting basis.

At action 908, solver 204 modifies the starting basis based on Δconstr1 (i.e. addition of new constraint made up of new variables such that the constraint is feasible when all new variables are set at zero value). According to embodiments, addition of new constraint having only new variables (i.e. Δconstr1) is ΔDF, which retains primal feasibility. Addition of a new constraint may affect primal feasibility, but modifications of the basis results in a primal feasible basis to LPP with Δconstr1 changes because the new constraint comprises only new variables and is feasible when the new variables are set at zero value, such as, for example, addition of lateable demand, by setting newly added constraint at lower bound in starting basis; and setting one variable in newly added constraint as basic variable in starting basis.

At action 910, solver 204 solves the current LPP with ΔDF using the primal simplex method by reading the current starting basis, as described above.

At action 912, solver 204 applies primal feasibility changes (ΔPF) According to embodiments, ΔPF keep dual feasibility intact and comprise addition of new constraints (Δconstr2), changes in lower/upper bounds (Abound), changes in right hand side value (Δrhs), and changes in lower/upper bounds to undo variable fixing based on the base run and to apply variable fixing based on previous objectives solved (Δvarfix_previous_objs) in a new run. According to embodiments, solver 204 fixes the variables to their lower/upper bounds to ensure that while solving a lower objective in the hierarchy, objective values of its higher objectives are not deteriorated. As stated above, variable fixing involves changes in lower and/or upper bounds of variables, which is a ΔPF.

At action 914, solver 204 solves the current LPP after both ΔDF and ΔPF are added, using the dual simplex method by reading a current starting basis comprising the optimal basis of the multi-objective hierarchical LPP with the ΔDF. In addition, because the current starting basis is the optimal basis of the LPP to which additional ΔPF changes are added, the current starting basis is dual feasible to the current LPP.

At action 916, solver 204 updates the list of lower/upper bound changes required for variable fixing based on the current solution by updating the Δvarfix_previous_objs. According to embodiments, the variable fixing bounds ensure that lower objectives (of the current run) do not deteriorate the objective value of current objective (of the current run).

At action 918, solver 204 increases the counter by one. According to embodiments, the counter N is set to N+1. Continuing with the previous example of N=1, the counter N is set to N=2, and solver 204 may load the multi-objective hierarchical LPP for the second objective and the optimal basis of the solution of the $2^{nd}$ objective from the base run.

At action 920, solver 204 checks whether the counter N is greater than the number of objectives. Solver 204 iteratively solves the multi-objective hierarchical LPP during a second run beginning with a first objective (N=1) until each objective level has been solved. Solver 204 determines when the last objective has been solved for the second run by checking whether counter N is greater than the number of objectives.

When solver 204 determines the counter is greater than the number of objectives, method 900 ends. However, when solver 204 determines the counter is not greater than the number of objectives, method 900 returns to action 904. Solver 204 iteratively solves additional objectives of the multi-objective hierarchical LPP as described above in connection with activities 904-920 until solver 204 determines the counter is greater than the number of objectives at action 920, at which point method 900 ends.

Figure 10:
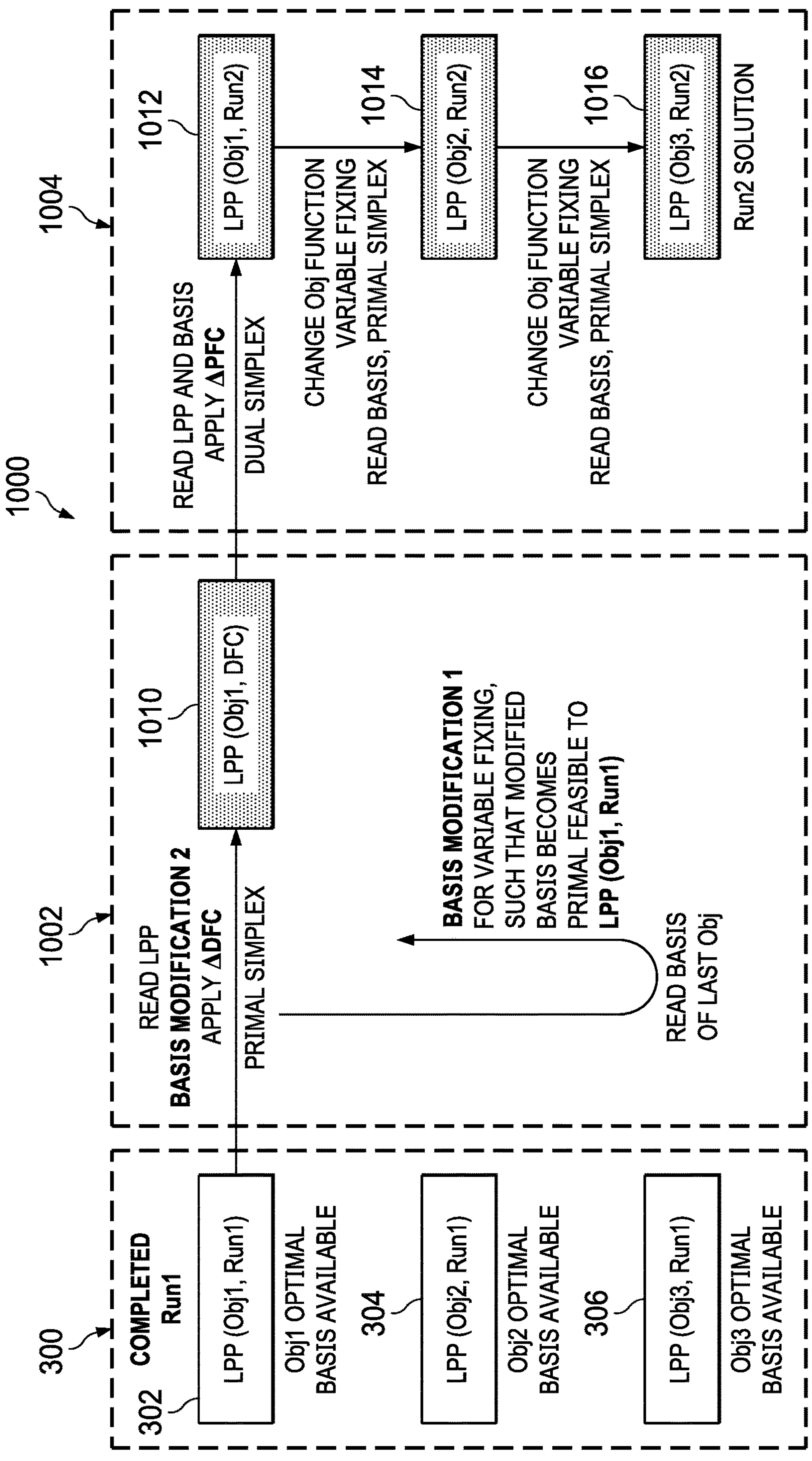
FIG. 10 illustrates a diagram of solving a multi-objective hierarchical LPP using an optimal basis of the last objective of a previous run and categorization of supply chain changes, in accordance with an embodiment.

FIG. 10 illustrates diagram 1000 of solving a multi-objective hierarchical LPP using an optimal basis of the last objective of a previous run and categorization of supply chain changes, in accordance with an embodiment. Diagram 100 is explained in connection with exemplary Run1 300 comprising three objectives (Obj1, Obj2, and Obj3) of the hierarchical multi-objective LPP and solution of LPP for Obj1 302; solution of LPP for Obj2 304; and solution of LPP for Obj3 306, as described above. Although exemplary objectives are shown and described, embodiments contemplate any objective represented by minimizing or maximizing any suitable objective function, according to particular needs.

As described in more detail in connection with FIG. 11, solver 204 uses the optimal basis of base run solution of LPP for the last objective, Obj3 306 in Run1 300 (e.g. the previous run from which the optimal basis is modified) to more efficiently solve the first objective in the ΔDF run, and the optimal basis of the first objective of the ΔDF run is used to more efficiently solve the first objective in a ΔPF run. Solver 204 may then use each optimal basis of an objective in a ΔPF run to solve the subsequent objective in the ΔPF run until reaching the last objective of the ΔPF run. For example, subsequent runs may be solved more efficiently by modifying the optimal basis of base run solution of LPP for Obj3 306 in Run1 300 to create the starting basis for the LPP solve of the first objective of the ΔDF run 1002 for the first objective using the primal simplex method, generating: ΔDF run solution of LPP for Obj1 1010. Solver 204 may then modify the optimal basis generated for ΔDF run solution of LPP for Obj1 1010 with ΔPF to solve the LPP for the first objective of ΔPF run 1004 with the dual simplex method generating ΔPF run solution of LPP for Obj1 1012. Finally, solver 204 uses the optimal basis of ΔPF run solution of LPP for Obj1 1012 with the primal simplex method to generate: ΔPF run solution of LPP for Obj2 1014, and, iteratively performs the same action to generate ΔPF run solution of LPP for Obj3 1016.

Figure 11:
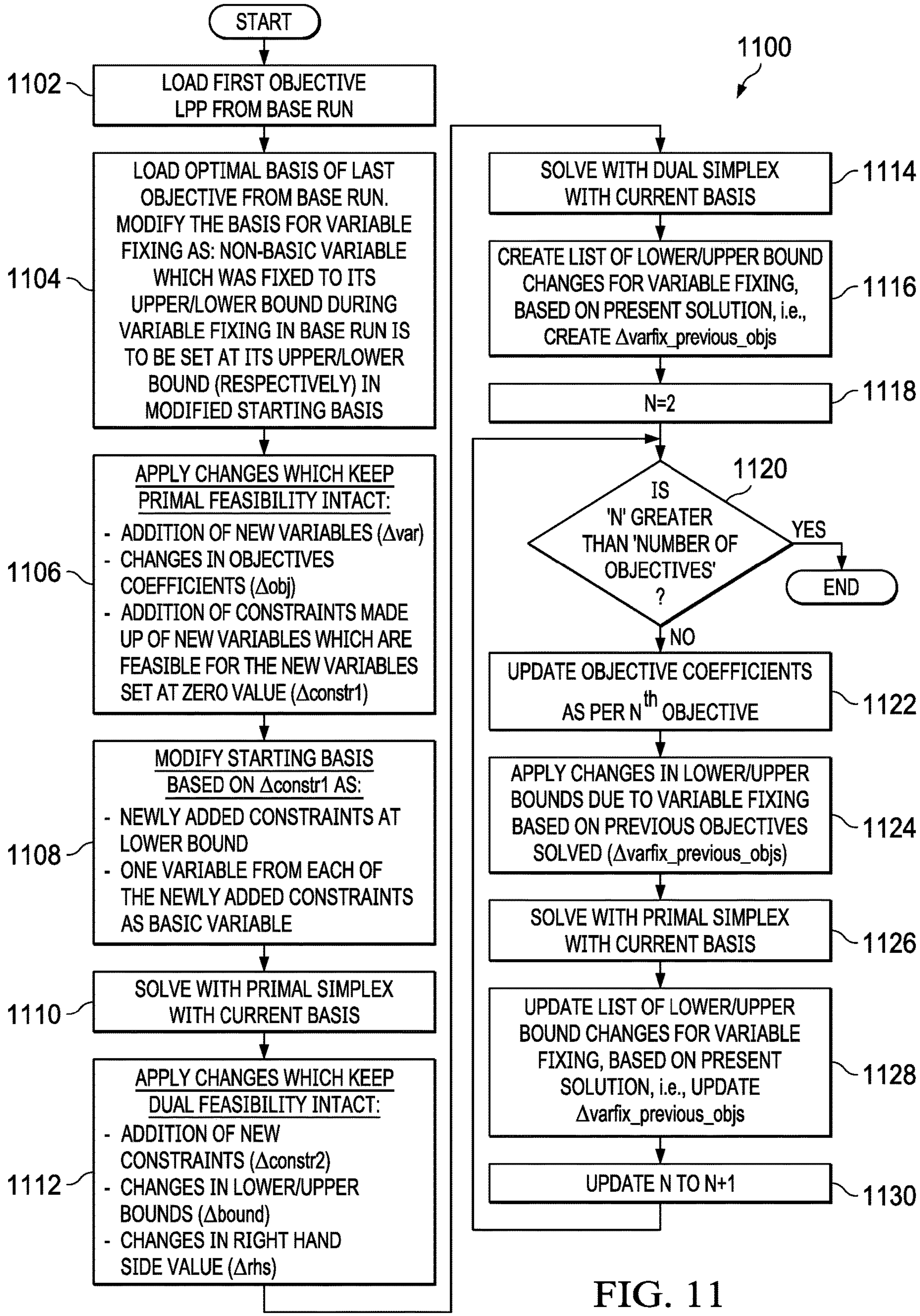
FIG. 11 illustrates a method of solving a multi-objective hierarchical LPP using an optimal basis of the last objective of a previous run and categorization of supply chain changes, in accordance with an embodiment.

By way of further explanation and not of limitation, a non-limiting example is given in connection with FIG. 11.

FIG. 11 illustrates method 1100 of solving a multi-objective hierarchical LPP using an optimal basis of the last objective of a previous run and categorization of supply chain changes, in accordance with an embodiment. Method 1100 of solving a multi-objective hierarchical LPP using an optimal basis of the last objective of a previous run and categorization of changes of the supply chain input data 210 proceeds by one or more activities, which although described in a particular order may be performed in one or more permutations, according to particular needs. According to embodiments, solver 204 of supply chain planner 110 efficiently solves the objectives in a new run (e.g. a second run or subsequent run) using an optimal basis of the last objective in base run 300 (e.g. a first run or previous run).

At action 1102, solver 204 loads into memory the LPP and the first objective from a base run. As stated above, solver 204 loads the multi-objective hierarchical LPP comprising the first objective (such as, for example, Obj1).

At action 1104, solver 204 loads the optimal basis of the last objective from the base run as a starting basis, and modifies the basis based on variable fixing of the base run for the first objective. According to embodiments, the starting basis for the first objective (such as, for example, Obj1) in the current run is derived from the optimal basis of last objective (such as, for example, Obj3) of base run 300 by modifying the optimal basis of the last objective in base run 300 to be primal feasible to the first objective in the base run, as follows: when the variable is non-basic in the current starting basis and was fixed to its upper bound as part of variable fixing during the base run, solver 204 sets this variable to its upper bound in the current basis; and when the variable is non-basic in the current starting basis and was fixed to its lower bound as part of variable fixing during the base run, solver 204 sets this variable to its lower bound in current basis.

At action 1106, solver 204 applies dual feasibility changes (ΔDF). As stated above, changes to the supply chain that are ΔDF comprise: addition of new variables (Δvar), changes in objective coefficients (Δobj), and addition of a constraint made up of new variables (Δconstr1), as described above.

At action 1108, solver 204 modifies the starting basis based on Δconstr1 (i.e. addition of new constraint made up of new variables such that the constraint is feasible when all new variables are set at zero value). According to embodiments, addition of new constraint having only new variables (i.e. Δconstr1) as ΔDF, which retains primal feasibility. Addition of a new constraint may affect primal feasibility, but modifications in the basis maintain a primal feasible basis for solving the LPP with Δconstr1 changes because the new constraint comprises only new variables and is feasible when the new variables are set at zero value, such as, for example, addition of lateable demand, by setting newly added constraint at lower bound in starting basis; and setting one variable in newly added constraint as basic variable in starting basis.

At action 1110, solver 204 solves the current LPP with the ΔDF changes using the primal simplex method by reading the current starting basis. At action 1112, solver 204 applies primal feasibility changes (ΔPF) According stated above, ΔPF comprise addition of new constraints (Δconstr2), changes in lower/upper bounds (Abound), and changes in right hand side value (Δrhs).

At action 1114, solver 204 solves the current LPP comprising both ΔDF and ΔPF using the dual simplex method by reading a current starting basis comprising the optimal basis of the multi-objective hierarchical LPP with the ΔDF. In addition, because the current starting basis is the optimal basis of the LPP to which additional ΔPF changes are added, the current starting basis is dual feasible to the current LPP. At action 1116, solver 204 updates the list of lower/upper bound changes required for variable fixing based on the current solution by updating the Δvarfix_previous_objs.

At action 1118, solver 204 sets the counter N to N=2. According to embodiments, the counter represents the number of iterations of the supply chain solving method, and solver 204 continues to iteratively solve the multi-objective hierarchical LPP until each objective has been solved (e.g. N is greater than the number of objectives).

At action 1120, solver 204 determines whether the counter (i.e. current objective count) is greater than the number of objectives. When the counter is greater than the number of objectives, method 1100 ends. When the counter is not greater than the number of objectives, method 1100 continues to action 1122. At action 1122, solver 204 updates the objective function of the current LPP according to the $N^{th}$ objective in the new run. For example, continuing with the previous example, solver 204 may update the objective function from Obj1 to Obj2 when N=2, and from Obj2 to Obj3 when N=3, as described above.

At action 1124, solver 204 applies changes in lower/upper bounds due to variable fixing based on previous objectives solved (Δvarfix_previous_objs). According to embodiments, solver 204 fixes the variables to their lower/upper bounds to ensure that while solving a lower objective in the hierarchy, objective values of its higher objectives are not deteriorated. Variable fixing involves changes in lower/upper bounds of variables and is a ΔPF.

At action 1126, solver 204 solves the current LPP using the primal simplex method by reading the current starting basis comprising is the optimal basis of previous objective of the new run. At action 1128, solver 204 updates the list of lower/upper bound changes required for variable fixing based on the current solution by updating Δvarfix_previous_objs. At action 1130, solver 204 increases the counter N (i.e. current objective count) by one, and solver 204 returns to action 1120 and determines if the counter is greater than the number of objectives. Solver 204 may continue iteratively solving additional objectives of the multi-objective hierarchical LPP as described above until the counter is greater than the number of objectives, at which point method 1100 ends.

According to embodiments, solver 204 repeats activities 1120-1132 and derives the final optimal basis from the first objective LPP of the new run from final optimal basis of the base run. According to embodiments comprising large supply chain changes (referred to as macro-changes, described in more detail, below) between the base run and the new run, the final optimal basis of base run may comprise common basic variables with the final optimal basis of the new run. According to these embodiments, solving a multi-objective hierarchical LPP using the final optimal basis of the base run while solving the new run may reduce the number of simplex method iterations and increase the performance advantage of the solve when compared with other solving methods.

As described in further detail below, method 1100 may solve macro changes more efficiently than method 900, while both methods solve micro changes efficiently. According to embodiments, method 400, method 900, and method 1100 are compared for several datasets by solving a multi-objective hierarchical LPP for a base run; solving the multi-objective hierarchical LPP with changes to the supply chain input data 210 using method 400; solving the multi-objective hierarchical LPP with changes to the supply chain input data 210 using method 900 and solution information from the base run; solving the multi-objective hierarchical LPP with changes to the supply chain input data 210 using method 1100 and solution information from the base run, and comparing the runtimes, objective values, and number of iterations.

FIG. 12 (depicted as FIGS. 12A and 12B) illustrates chart 1200 comprising results of solving multi-objective hierarchical LPP with micro-changes between a base run and a current run, in accordance with an embodiment. Micro-changes, which may also be referred to as unit changes, comprise, for example, changes to the supply chain between the base run and a new run that comprise only a single change. Chart 1200 comprises eighteen trials (Exp. No. 1202) for three exemplary datasets 1204 (Dataset 1, Dataset 2, and Dataset 3) comparing method 400 with method 900 and method 1100 (Method 400 Run Time 1206, Method 900 Run Time 1208, Improvement of Method 900 over Method 400 (times) 1210, Improvement of Method 900 over Method 400 (% of solve time) 1212, Method 1100 Run time 1214, Improvement of Method 1100 over Method 400 (times) 1216, Improvement of Method 1100 over Method 400 (% of solve time) 1218) for single changes which are indicated by Unit Change Description 1220 (demand addition 1222, demand need date change 1224, demand need quantity change 1226, demand priority change 1228, capacity change 1230, WIP change 1232, and fixed operation plan 1234. In the first dataset (represented by Exp. No. 1202 of 1-6), the tested unit changes comprise: demand addition 1222, demand need date change 1224, demand priority change 1228, capacity change 1230, WIP change 1232, and fixed operation plan 1234. For the second and third datasets (represented by Exp. No. 1202 of 7-12 and 13-18, respectively) the unit changes comprise: demand addition 1222, demand need quantity change 1226, demand priority change 1228, capacity change 1230, WIP change 1232, and fixed operation plan 1234.

As may be seen by referring to the illustrated embodiment, method 900 was 1.65 times faster than method 400 when solving demand addition 1222 in the first dataset, while method 1100 was 7.59 times faster than method 400. In seventeen of eighteen trials, method 900 and method 1100 were faster than method 400. Method 900 took less than 6% of the run time of method 400 in thirteen of the eighteen trials. Method 1100 took less than 20% of the run time of method 400 in seventeen of the eighteen trials. In fourteen out of eighteen trials, method 900 was faster than method 1100 when solving the exemplary multi-objective hierarchical LPP. However, in four of the eighteen trials, method 1100 was faster than method 900.

FIG. 13 (depicted as FIGS. 13A and 13B) illustrates chart 1300 of results with macro-changes between a base run and a current run, in accordance with an embodiment. According to some embodiments, at least two changes in the supply chain between a base run and a new run may be referred to as macro changes. Chart 1300 comprises eleven trials (Exp. No. 1302) for three exemplary datasets 1304 (Dataset A, Dataset B, and Dataset C) comparing method 400 with method 1100 (Method 400 Run Time 1306, Method 1100 Run Time 1308, Improvement of Method 1100 over Method 400 (times) 1310, Improvement of Method 1100 over Method 400 (% of solve time) 1312) for macro-changes comprising: WIP changes 1314, Demand changes 1316, and operation plan changes 1318. WIP changes 1314 comprise, for example, WIP is carried forward from day one to day two, and day one supplies are set to zero. Demand changes 1316 comprise, for example, various percentage changes of need quantities. Operation plan changes 1318 comprise for example, moving operations from one day to another, or setting operations on a particular day at zero. As illustrated in chart 1300, in all eleven trials for the three exemplary datasets, method 1100 is significantly faster than method 400 (4-60% faster).

In addition, method 1100 often performs better than method 900 for solving supply chain planning problems modeled as multi-objective hierarchical LPP with macro changes, while both method 900 and method 1100 may efficiently solve supply chain planning problems modeled as multi-objective hierarchical LPP with micro changes.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for efficiently updating a solution to a supply chain problem to reduce computer solve time, comprising:

the computer, comprising a processor and memory, the computer configured to:

scan, by a radio receiver and transmitter configured to read an electronic tag, an RFID tag of products to determine locations of the products;

in response to changing the supply chain problem by adding a new non-lateable demand, add a corresponding new variable, wherein adding the corresponding new variable retains primal feasibility;

in response to changing the supply chain problem by changing a demand priority, change a corresponding objective coefficient, wherein changing the corresponding objective coefficient retains primal feasibility;

in response to changing the supply chain problem by changing a demand quantity, change a corresponding upper bound, wherein changing the corresponding upper bound does not retain primal feasibility;

in response to changing the supply chain problem by changing a demand need date, change at least a corresponding objective coefficient, wherein changing the corresponding objective coefficient does not retain primal feasibility;

in response to changing the supply chain problem by adding a new lateable demand, add at least a corresponding new constraint, wherein adding the corresponding new constraint retains primal feasibility;

in response to changing the supply chain problem by one of:

adding work-in-progress;

changing a work-in-progress quantity; or changing a work-in-progress date, change a corresponding right hand side value, wherein changing the corresponding right hand side value does not retain primal feasibility;

update the solution to the supply chain planning problem in response to one or more of the changes to the supply chain problem to reduce the computer solve time, wherein updating the solution to the supply chain problem comprises loading the supply chain problem and an optimal basis from a previous solving run, categorizing the one or more changes to the supply chain problem as (i) dual feasibility changes that retain primal feasibility of the optimal basis or (ii) primal feasibility changes that retain dual feasibility of the optimal basis, applying the dual feasibility changes to generate a primal feasible starting basis, solving the supply chain problem using a primal simplex method, applying the primal feasibility changes to a resulting optimal basis from the primal simplex method to generate a dual feasible starting basis, and solving the supply chain problem using a dual simplex method;

instruct automated machinery to produce the products according to the updated solution, wherein the automated machinery receives and executes the instructions to produce the products according to the updated solution; and instruct robotic warehouse systems to adjust inventory levels of the products at one or more stocking points, wherein the robotic warehouse systems receive and execute the instructions to adjust the inventory levels of the products at the one or more stocking points; and automated machinery configured to:

produce the products according to the updated solution; and robotic warehouse systems configured to:

adjust the inventory levels of the products at the one or more stocking points.

2. The system of claim 1, wherein the computer is further configured to:

map one or more mathematical constraints, one or more objectives and one or more bounds to one or more mathematical expressions in the supply chain problem.

3. The system of claim 1, wherein the computer is further configured to:

use an optimal basis and a list of one or more variables generated from an earlier solving of the supply chain problem during a later solving run of the supply chain problem.

4. The system of claim 3, wherein the optimal basis of the supply chain problem is primal feasible and dual feasible.

5. The system of claim 1, wherein the change in response to the changing of the demand need date further comprises: adding a new demand, changing the corresponding objective coefficient of an existing demand to zero, and changing a need quantity of an existing demand to zero.

6. The system of claim 1, wherein the change in response to adding the new lateable demand further comprises:

setting the corresponding new constraint at a lower bound in a starting basis; and setting one variable in the corresponding new constraint as a basic variable in the starting basis.

7. The system of claim 1, wherein the solution is updated according to an order the one or more changes are received.

8. A method for efficiently updating a solution to a supply chain problem to reduce computer solve time, comprising:

scanning, by a radio receiver and transmitter configured to read an electronic tag, an RFID tag of products to determine locations of the products;

in response to changing the supply chain problem by adding a new non-lateable demand, adding, by the computer comprising a processor and memory, a corresponding new variable, wherein adding the corresponding new variable retains primal feasibility;

in response to changing the supply chain problem by changing a demand priority, changing, by the computer, a corresponding objective coefficient, wherein changing the corresponding objective coefficient retains primal feasibility;

in response to changing the supply chain problem by changing a demand quantity, changing, by the computer, a corresponding upper bound, wherein changing the corresponding upper bound does not retain primal feasibility;

in response to changing the supply chain problem by changing a demand need date, changing, by the computer, at least a corresponding objective coefficient, wherein changing the corresponding objective coefficient does not retain primal feasibility;

in response to changing the supply chain problem by adding a new lateable demand, adding, by the computer, at least a corresponding new constraint, wherein adding the corresponding new constraint retains primal feasibility;

in response to changing the supply chain problem by one of:

adding work-in-progress;

changing a work-in-progress quantity; or changing a work-in-progress date, changing, by the computer, a corresponding right hand side value, wherein changing the corresponding right hand side value does not retain primal feasibility;

updating, by the computer, the solution to the supply chain problem in response to one or more of the changes to the supply chain problem to reduce the computer solve time, wherein updating the solution to the supply chain problem comprises loading the supply chain problem and an optimal basis from a previous solving run, categorizing the one or more changes to the supply chain problem as (i) dual feasibility changes that retain primal feasibility of the optimal basis or (ii) primal feasibility changes that retain dual feasibility of the optimal basis, applying the dual feasibility changes to generate a primal feasible starting basis, solving the supply chain problem using a primal simplex method, applying the primal feasibility changes to a resulting optimal basis from the primal simplex method to generate a dual feasible starting basis, and solving the supply chain problem using a dual simplex method;

instructing, by the computer, automated machinery to produce the products according to the updated solution, wherein the automated machinery receives and executes the instructions to produce the products according to the updated solution;

instructing, by the computer, robotic warehouse systems to adjust inventory levels of the products at one or more stocking points, wherein the robotic warehouse systems receive and execute the instructions to adjust the inventory levels of the products at the one or more stocking points;

producing, by the automated machinery, the products according to the updated solution; and adjusting, by the robotic warehouse systems, inventory levels of the products at the one or more stocking points.

9. The method of claim 8, further comprising:

mapping, by the computer, one or more mathematical constraints, one or more objectives and one or more bounds to one or more mathematical expressions in the supply chain problem.

10. The method of claim 8, further comprising:

using, by the computer, an optimal basis and a list of one or more variables generated from an earlier solving of the supply chain problem during a later solving run of the supply chain problem.

11. The method of claim 8, wherein the optimal basis of the supply chain problem is primal feasible and dual feasible.

12. The method of claim 8, wherein the change in response to the changing the demand need date further comprises: adding a new demand, changing the corresponding objective coefficient of an existing demand to zero, and changing a need quantity of an existing demand to zero.

13. The method of claim 8, wherein the change in response to adding the new lateable demand further comprises:

setting the corresponding new constraint at a lower bound in a starting basis; and setting one variable in the corresponding new constraint as a basic variable in the starting basis.

14. The method of claim 8, wherein the solution is updated according to an order the one or more changes are received.

15. A non-transitory computer-readable medium embodied with software for efficiently updating a solution to a supply chain problem to reduce computer solve time, wherein the software when executed by the computer is configured to:

scan, by a radio receiver and transmitter configured to read an electronic tag, an RFID tag of products to determine locations of the products;

in response to changing the supply chain problem by adding a new non-lateable demand, add a corresponding new variable, wherein adding the corresponding new variable retains primal feasibility;

in response to changing the supply chain problem by changing a demand priority, change a corresponding objective coefficient, wherein changing the corresponding objective coefficient retains primal feasibility;

in response to changing the supply chain problem by changing a demand quantity, change a corresponding upper bound, wherein changing the corresponding upper bound does not retain primal feasibility;

in response to changing the supply chain problem by changing a demand need date, change at least a corresponding objective coefficient, wherein changing the corresponding objective coefficient does not retain primal feasibility;

in response to changing the supply chain problem by adding a new lateable demand, add at least a corresponding new constraint, wherein adding the corresponding new constraint retains primal feasibility;

in response to changing the supply chain problem by one of:

adding work-in-progress;

changing a work-in-progress quantity; or changing a work-in-progress date of the supply chain problem, change a corresponding right hand side value, wherein changing the corresponding right hand side value does not retain primal feasibility;

update the solution to the supply chain problem in response to one or more of the changes to the supply chain problem to reduce the computer solve time, wherein updating the solution to the supply chain problem comprises loading the supply chain problem and an optimal basis from a previous solving run, categorizing the one or more changes to the supply chain problem as (i) dual feasibility changes that retain primal feasibility of the optimal basis or (ii) primal feasibility changes that retain dual feasibility of the optimal basis, applying the dual feasibility changes to generate a primal feasible starting basis, solving the supply chain problem using a primal simplex method, applying the primal feasibility changes to a resulting optimal basis from the primal simplex method to generate a dual feasible starting basis, and solving the supply chain problem using a dual simplex method;

instruct automated machinery to produce the products according to the updated solution, wherein the automated machinery receives and executes the instructions to produce the products according to the updated solution;

instruct robotic warehouse systems to adjust inventory levels of the products at one or more stocking points, wherein the robotic warehouse systems receive and execute the instructions to adjust the inventory levels of the products at the one or more stocking points;

produce, by the automated machinery, the products according to the updated solution; and adjust, by the robotic warehouse systems, inventory levels of the products at the one or more stocking points.

16. The non-transitory computer-readable medium of claim 15, wherein the software when executed is further configured to:

map one or more mathematical constraints, one or more objectives and one or more bounds to one or more mathematical expressions in the supply chain problem.

17. The non-transitory computer-readable medium of claim 15, wherein the software when executed is further configured to:

use an optimal basis and a list of one or more variables generated from an earlier solving of the supply chain problem during a later solving run of the supply chain problem.

18. The non-transitory computer-readable medium of claim 17, wherein the optimal basis of the supply chain problem is primal feasible and dual feasible.

19. The non-transitory computer-readable medium of claim 18, wherein the change in response to the changing the demand need date further comprises: adding a new demand, changing the corresponding objective coefficient of an existing demand to zero, and changing a need quantity of an existing demand to zero.

20. The non-transitory computer-readable medium of claim 15, wherein the change in response to adding the new lateable demand further comprises:

setting the corresponding new constraint at a lower bound in a starting basis; and setting one variable in the corresponding new constraint as a basic variable in the starting basis.

* * * * *